US012614021B2

(12) United States Patent
Maman

(10) Patent No.: US 12,614,021 B2
(45) Date of Patent: Apr. 28, 2026

(54) SYSTEM AND METHOD FOR INTEGRATED TEMPORAL EXTERNAL RESOURCE ALLOCATION

(71) Applicant: WIX.COM LTD., Tel Aviv-Jaffa (IL)

(72) Inventor: Yaniv Yaakob Maman, Tel Aviv (IL)

(73) Assignee: WIX.COM LTD., Tel Aviv-Jaffa (IL)

( * ) Notice: Subject to any disclaimer, the term of this patent is extended or adjusted under 35 U.S.C. 154(b) by 312 days.

(21) Appl. No.: 18/401,028

(22) Filed: Dec. 29, 2023

(65) Prior Publication Data

US 2024/0220710 A1     Jul. 4, 2024

Related U.S. Application Data

(60) Provisional application No. 63/436,281, filed on Dec. 30, 2022.

(51) Int. Cl.
*G06F 40/166* (2020.01)

(52) U.S. Cl.
CPC .................................. *G06F 40/166* (2020.01)

(58) Field of Classification Search
CPC ..................................................... G06F 40/166
See application file for complete search history.

(56) References Cited

U.S. PATENT DOCUMENTS

| | | | |
|---|---|---|---|
| 6,684,369 B1 * | 1/2004 | Bernardo et al. ......... | G06F 7/00 |
| 2014/0075283 A1 * | 3/2014 | Coursol .................. | G06F 17/00 |
| 2019/0034982 A1 * | 1/2019 | Kulp et al. ......... | G06Q 30/0277 |
| 2020/0151241 A1 * | 5/2020 | Samireddy et al. ........................ | |
| | | | G06F 17/2247 |
| 2021/0081475 A1 * | 3/2021 | Pham et al. .......... | G06F 16/958 |
| 2022/0197969 A1 | 6/2022 | Cohen et al. | |

OTHER PUBLICATIONS

International Search Report and Written Opinion issued for International Application No. PCT/IB2023/063387 (ISA/EP) mailed Mar. 27, 2024 (23 pages).

* cited by examiner

*Primary Examiner* — James J Debrow
(74) *Attorney, Agent, or Firm* — ALSTON & BIRD LLP

(57) ABSTRACT

Provided is a website building system with temporal external resource allocation integration.

23 Claims, 19 Drawing Sheets

100

Retrieving a website identifier associated with a website assembled based at least in part on the one or more website building repositories, where the website identifier is selected from a plurality of website identifiers, and where the website identifier is associated with an editing user identifier of the plurality of editing user identifiers ⌐ 102

Retrieving end-user data from an end-user data corpus comprising electronic interaction data associated with a first end-user identifier of a plurality of end-user identifiers, where the end-user data associated with the first end-user identifier comprises one or more electronic interactions performed by a first client computing device associated with the first end-user identifier accessing one or more websites assembled based at least in part on the one or more website building repositories ⌐ 104

Retrieving a multi-dimensional booking matrix maintained by the website building system and associated with the website identifier, where the multi-dimensional TER matrix comprises a plurality of TER vectors ⌐ 106

Based at least in part on applying one or more trained machine learning models or one or more rule-based models to historical editing interactions associated with the editing user identifier and the end-user data, selecting a TER vector ⌐ 108

Generating an electronic TER recommendation interface according to the booking vector ⌐ 110

Transmitting the electronic TER recommendation interface to a client computing device associated with the first end-user identifier or the editing user identifier ⌐ 112

Retrieving a website identifier associated with a website assembled based at least in part on the one or more website building repositories, where the website identifier is selected from a plurality of website identifiers, and where the website identifier is associated with an editing user identifier of the plurality of editing user identifiers ⟋ 402

Retrieving end-user data from an end-user data corpus comprising electronic interaction data associated with a plurality of end-user identifiers, wherein the end-user data comprises one or more electronic interactions performed by a plurality of client computing devices associated with the plurality of end-user identifiers accessing one or more websites assembled based at least in part on the one or more website building repositories ⟋ 404

Selecting, based on applying one or more trained machine learning models or rules based models to the end-user data and website editing historical interactions associated with the website identifier, a first end-user identifier among the plurality of end-user identifiers as an engagement transmission candidate in accordance with an engagement score ⟋ 406

Generating an engagement transmission based on the first-end user identifier and the website identifier ⟋ 408

Transmitting the engagement transmission to a client computing device associated with the first end-user identifier ⟋ 410

Figure 6A:
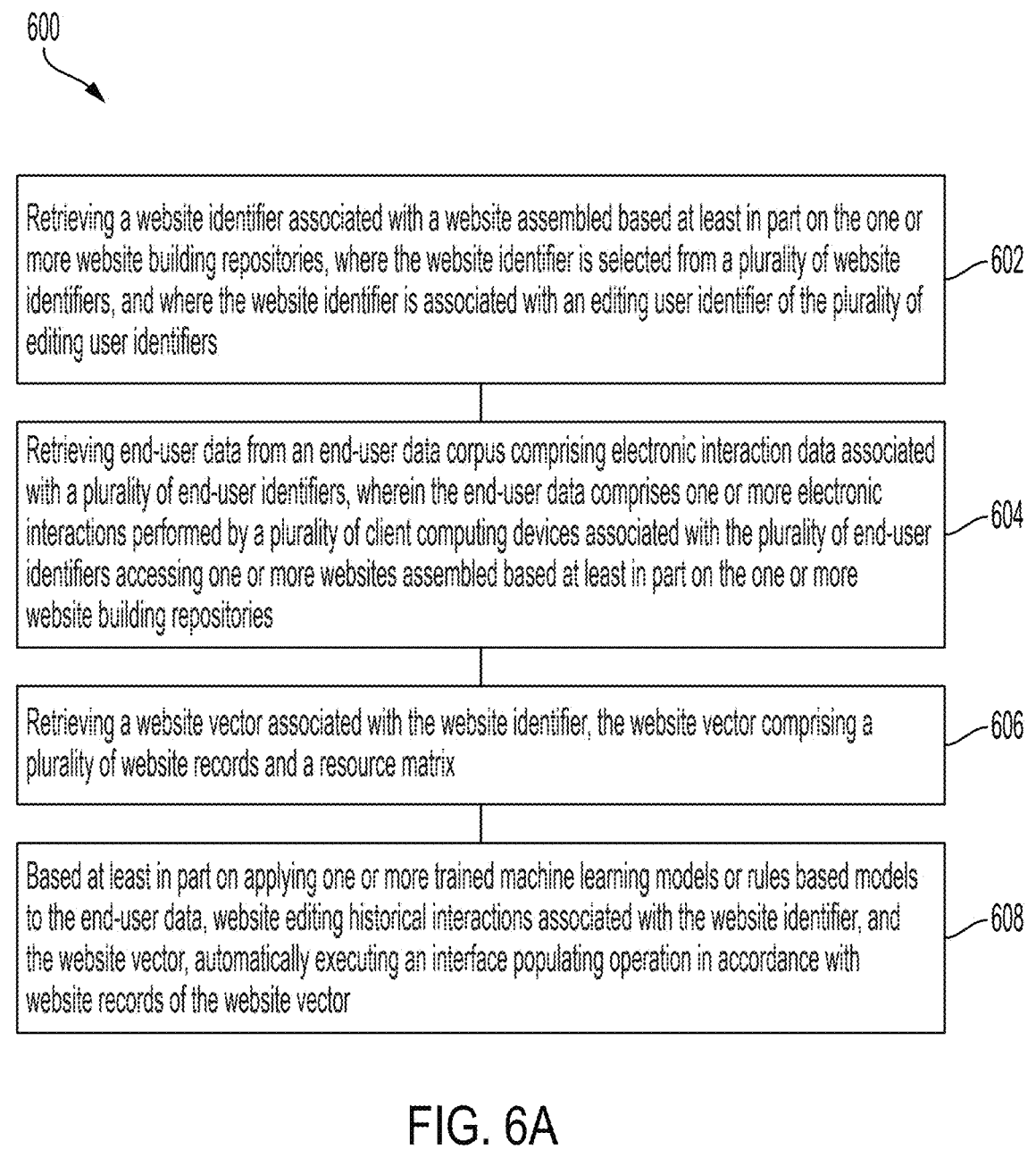

Retrieving a website identifier associated with a website assembled based at least in part on the one or more website building repositories, where the website identifier is selected from a plurality of website identifiers, and where the website identifier is associated with an editing user identifier of the plurality of editing user identifiers ⎯602

Retrieving end-user data from an end-user data corpus comprising electronic interaction data associated with a plurality of end-user identifiers, wherein the end-user data comprises one or more electronic interactions performed by a plurality of client computing devices associated with the plurality of end-user identifiers accessing one or more websites assembled based at least in part on the one or more website building repositories ⎯604

Retrieving a website vector associated with the website identifier, the website vector comprising a plurality of website records and a resource matrix ⎯606

Based at least in part on applying one or more trained machine learning models or rules based models to the end-user data, website editing historical interactions associated with the website identifier, and the website vector, automatically executing an interface populating operation in accordance with website records of the website vector ⎯608

FIG. 6A 700 (cont'd)

SYSTEM AND METHOD FOR INTEGRATED TEMPORAL EXTERNAL RESOURCE ALLOCATION

CROSS-REFERENCE TO RELATED APPLICATIONS

The present application claims priority to U.S. Provisional Application No. 63/436,281, titled "SYSTEM AND METHOD FOR INTEGRATED TEMPORAL EXTERNAL RESOURCE ALLOCATION," filed Dec. 30, 2022, the entire contents of which are incorporated herein by reference.

TECHNOLOGICAL FIELD

Example embodiments of the present disclosure relate generally to visual editing technologies and, more particularly, to a system, apparatus, method, and computer program product for integrating temporal external resource vector allocation operations, engagement transmission generations, and automatic execution of pre-populating operations within a website building system.

BACKGROUND

Various applications may offer online temporal external resource allocation capabilities. However, integrating optimized resource allocation operations into a website during a website-building process is technologically complex and fraught with issues. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

Embodiments herein provide for a website building system configured to provide temporal external resource (TER) integration within websites generated using the website building system. In embodiments, the website building system comprises one or more website building repositories storing one or more website building components and one or more website editing historical interactions associated with a plurality of editing user identifiers, and one or more processors configured to execute software instructions to perform operations for automatically generating electronic temporal external resource (TER) vector allocation recommendation interfaces. In embodiments, the operations comprise retrieving a website identifier associated with a website assembled based at least in part on the one or more website building repositories, where the website identifier is selected from a plurality of website identifiers, and where the website identifier is associated with an editing user identifier of the plurality of editing user identifiers. In embodiments, the operations further comprise retrieving end-user data from an end-user data corpus comprising electronic interaction data associated with a first end-user identifier of a plurality of end-user identifiers, where the end-user data associated with the first end-user identifier comprises one or more electronic interactions performed by a first client computing device associated with the first end-user identifier accessing one or more websites assembled based at least in part on the one or more website building repositories. In embodiments, the operations further comprise retrieving a multi-dimensional temporal external resource (TER) matrix maintained by the website building system and associated with the website identifier, where the multi-dimensional TER matrix comprises a plurality of TER vectors. In embodiments, the operations further comprise, based at least in part on applying one or more trained machine learning models or one or more rule-based models to historical editing interactions associated with the editing user identifier and the end-user data, selecting a TER vector. In embodiments, the operations further comprise generating an electronic TER recommendation interface according to the TER vector. In embodiments, the operations further comprise transmitting the electronic TER recommendation interface to a client computing device associated with the first end-user identifier or the editing user identifier.

Embodiments herein further provide for a website building system configured to automatically generate recommended engagement transmissions. In embodiments, the website building system comprises one or more website building repositories storing one or more website building components and one or more website editing historical interactions associated with a plurality of editing user identifiers, and one or more processors configured to execute software instructions to perform operations for automatically generating recommended engagement transmissions. In embodiments, the operations comprise retrieving a website identifier associated with a website assembled based at least in part on the one or more website building repositories, where the website identifier is selected from a plurality of website identifiers, and where the website identifier is associated with an editing user identifier of the plurality of editing user identifiers. In embodiments, the operations further comprise retrieving end-user data from an end-user data corpus comprising electronic interaction data associated with a plurality of end-user identifiers, where the end-user data comprises one or more electronic interactions performed by a plurality of client computing devices associated with the plurality of end-user identifiers accessing one or more websites assembled based at least in part on the one or more website building repositories. In embodiments, the operations further comprise selecting, based at least in part on applying one or more trained machine learning models or rule-based models to the end-user data and website editing historical interactions associated with the website identifier, a first end-user identifier among the plurality of end-user identifiers as an engagement transmission candidate in accordance with an engagement score. In embodiments, the operations further comprise generating an engagement transmission based at least in part on the first-end user identifier and the website identifier. In embodiments, the operations further comprise transmitting the engagement transmission to a client computing device associated with the first end-user identifier.

Embodiments herein further provide for a website building system configured to automatically execute interface population operations. In embodiments, the website building system comprises one or more website building repositories storing one or more website building components and one or more website editing historical interactions associated with a plurality of editing user identifiers, and one or more processors configured to execute software instructions to perform operations for automatically executing interface population operations. In embodiments, the operations comprise retrieving a website identifier associated with a website assembled based at least in part on the one or more website building repositories, where the website identifier is selected from a plurality of website identifiers, and where the website identifier is associated with an editing user identifier of the plurality of editing user identifiers. In embodiments, the operations further comprise retrieving a website vector associated with the website identifier, the website vector comprising a plurality of website records and a resource matrix. In embodiments, the operations further comprise retrieving end-user data from an end-user data corpus comprising electronic interaction data associated with a plurality of end-user identifiers, where the end-user data comprises one or more electronic interactions performed by a plurality of client computing devices associated with the plurality of end-user identifiers accessing one or more websites assembled based at least in part on the one or more website building repositories. In embodiments, the operations further comprise, based at least in part on applying one or more trained machine learning models or rule-based models to the end-user data, website editing historical interactions associated with the website identifier, and the website vector, automatically executing an interface populating operation in accordance with website records of the website vector.

Embodiments herein further provide for a website building system configured to provide temporal external resource (TER) integration. In embodiments, the website building system comprises one or more website building repositories storing one or more website building components and one or more website editing historical interactions associated with a plurality of editing user identifiers, and one or more processors configured to execute software instructions to perform operations for automatically generating electronic temporal external resource (TER) vector allocation recommendation responses. In embodiments, the operations comprise receiving a TER vector allocation recommendation request, where the TER vector allocation recommendation request comprises allocation request metadata. In embodiments, the operations further comprise extracting the allocation request metadata. In embodiments, the operations further comprise, based at least in part on the allocation request metadata, retrieving one or more website identifiers associated with a website assembled based at least in part on the one or more website building repositories, where the one or more website identifiers are selected from a plurality of website identifiers, and where the one or more website identifiers are each associated with an editing user identifier of the plurality of editing user identifiers. In embodiments, the operations further comprise retrieving end-user data from an end-user data corpus comprising electronic interaction data associated with a first end-user identifier of a plurality of end-user identifiers, where the end-user data associated with the first end-user identifier comprises one or more electronic interactions performed by a first client computing device associated with the first end-user identifier accessing one or more websites assembled based at least in part on the one or more website building repositories. In embodiments, the operations further comprise, based at least in part on applying one or more trained machine learning models or one or more rule-based models to historical editing interactions associated with the editing user identifier and the end-user data, selecting a TER vector. In embodiments, the operations further comprise generating an TER vector allocation recommendation according to the TER vector. In embodiments, the operations further comprise transmitting the TER vector allocation recommendation to a requesting client computing device.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE SEVERAL VIEWS OF THE DRAWINGS

Figure 1B:
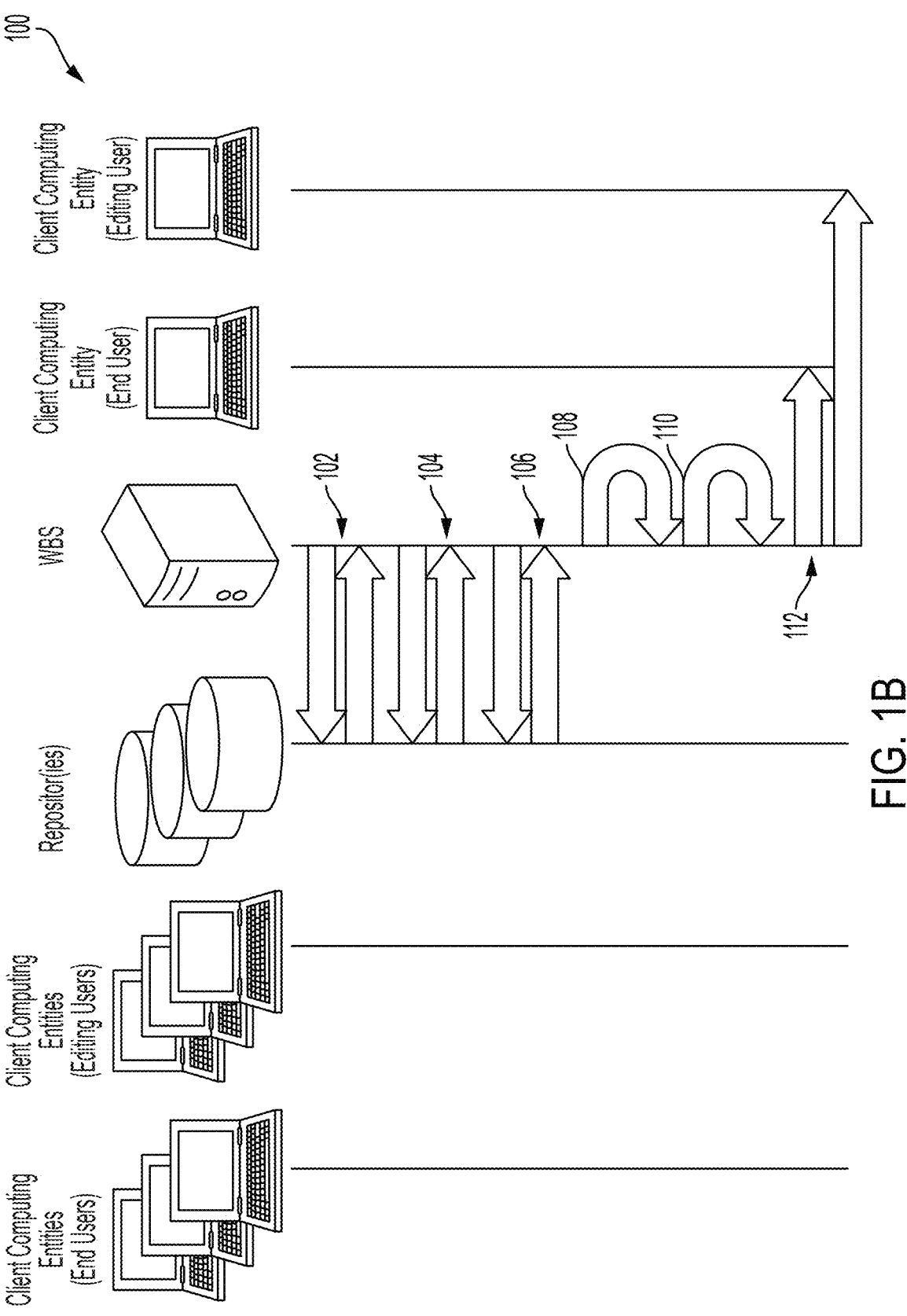
Figure 2A:
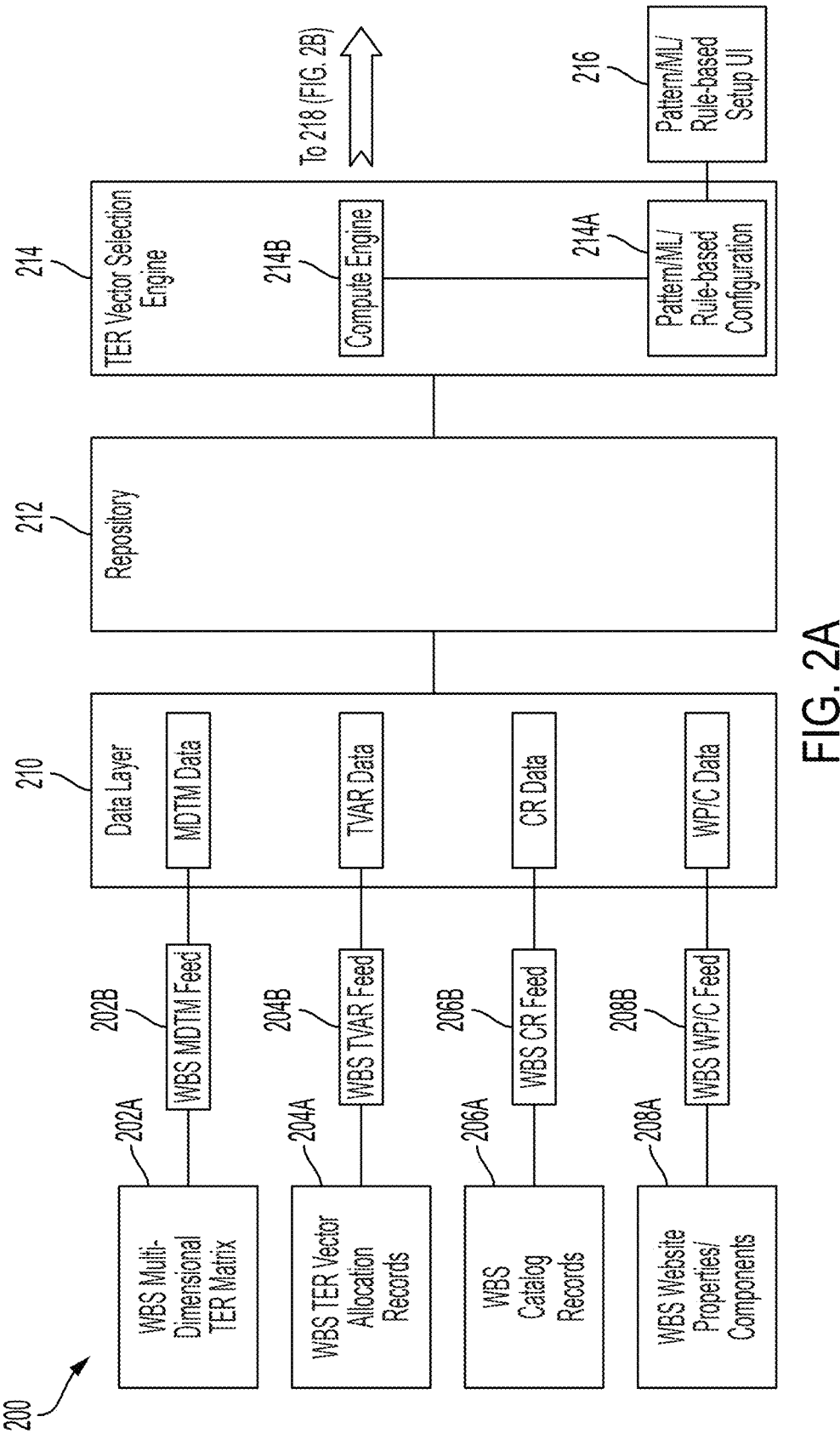
Figure 2B:
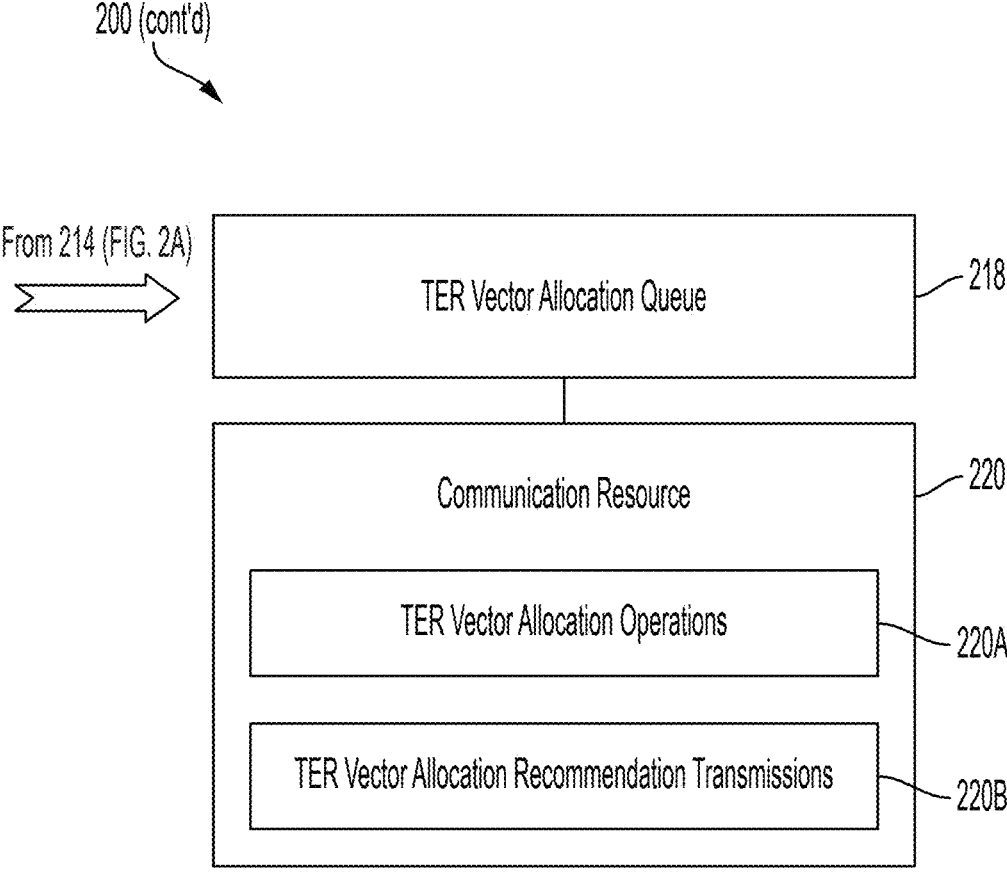
Figure 3A:
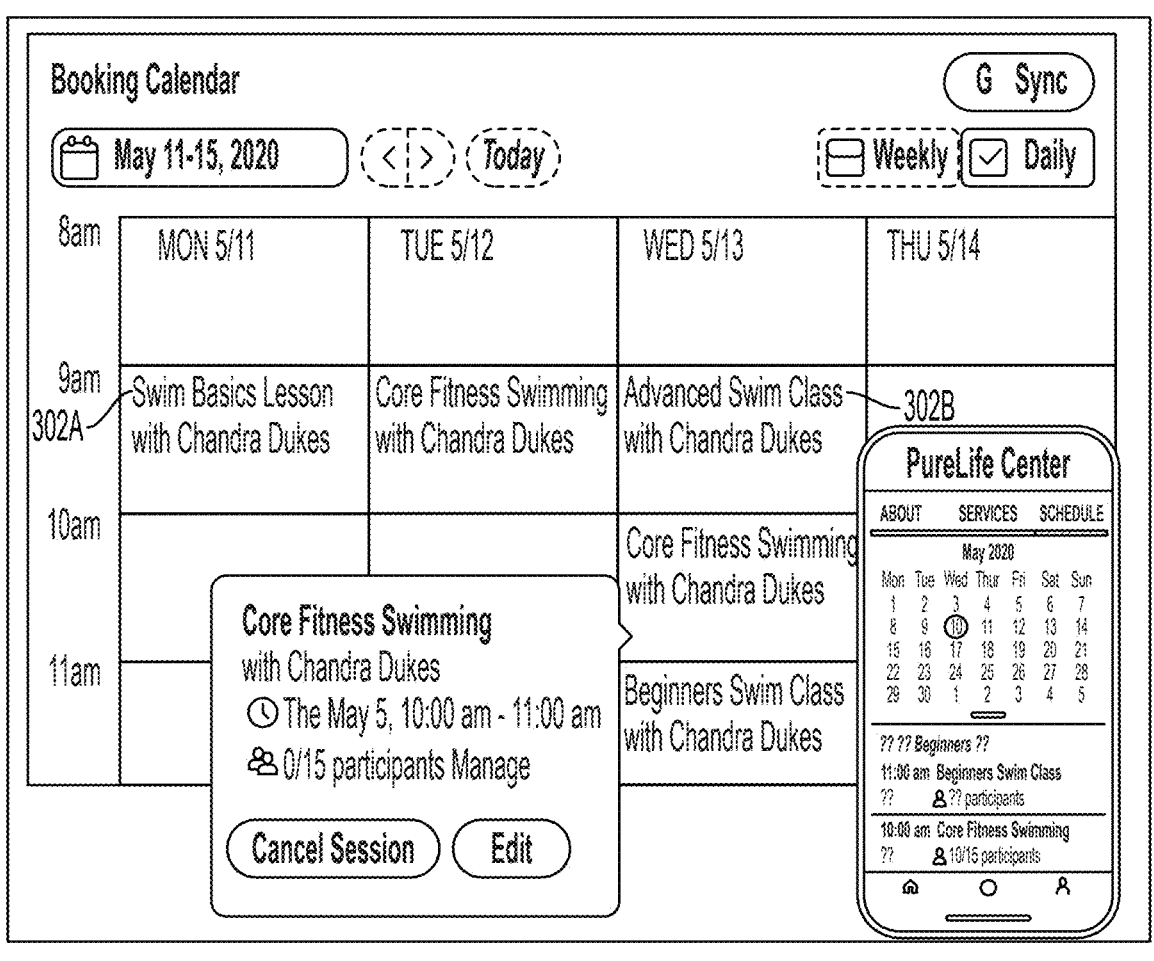
Figure 3B:
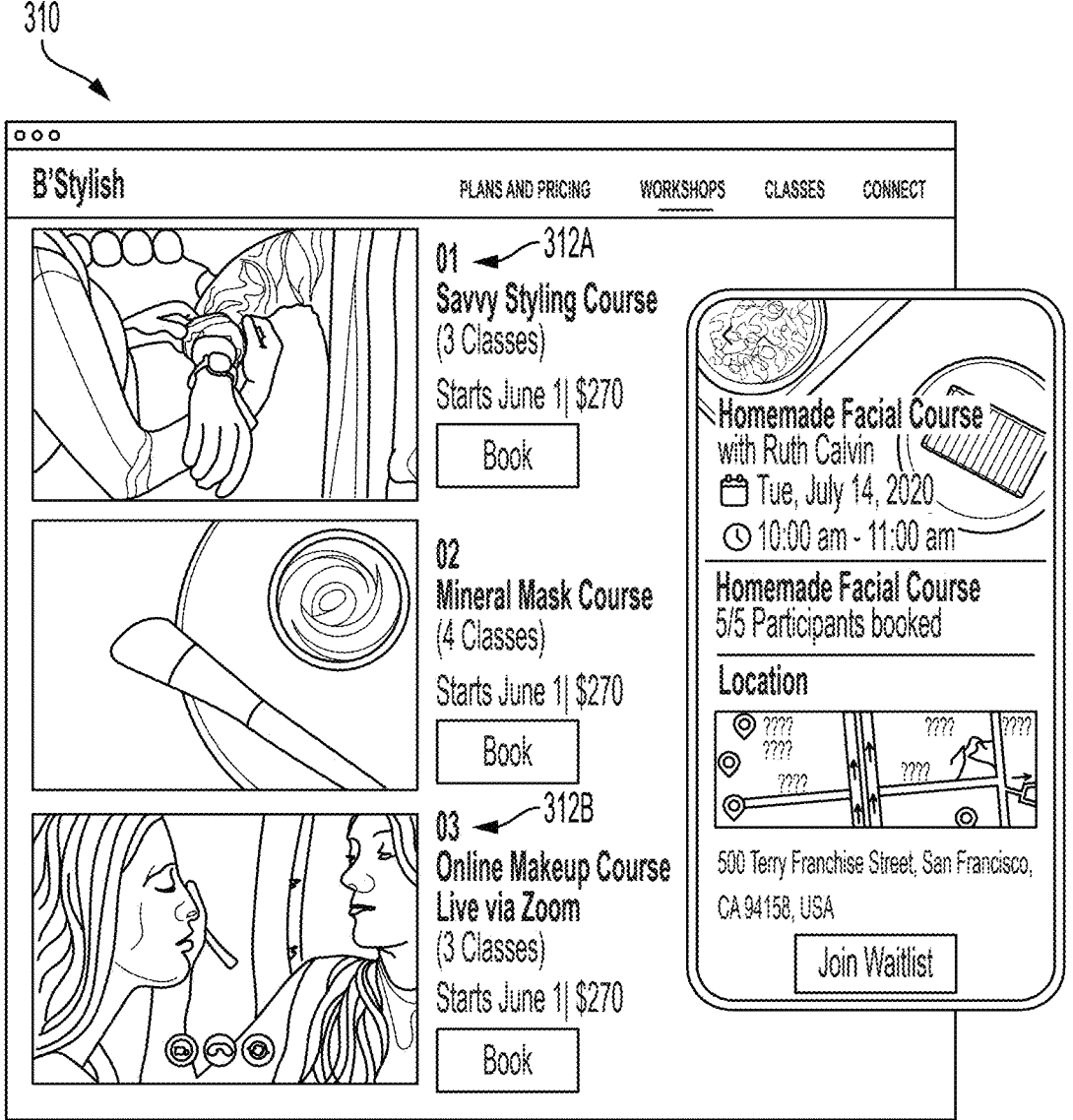
Figure 4B:
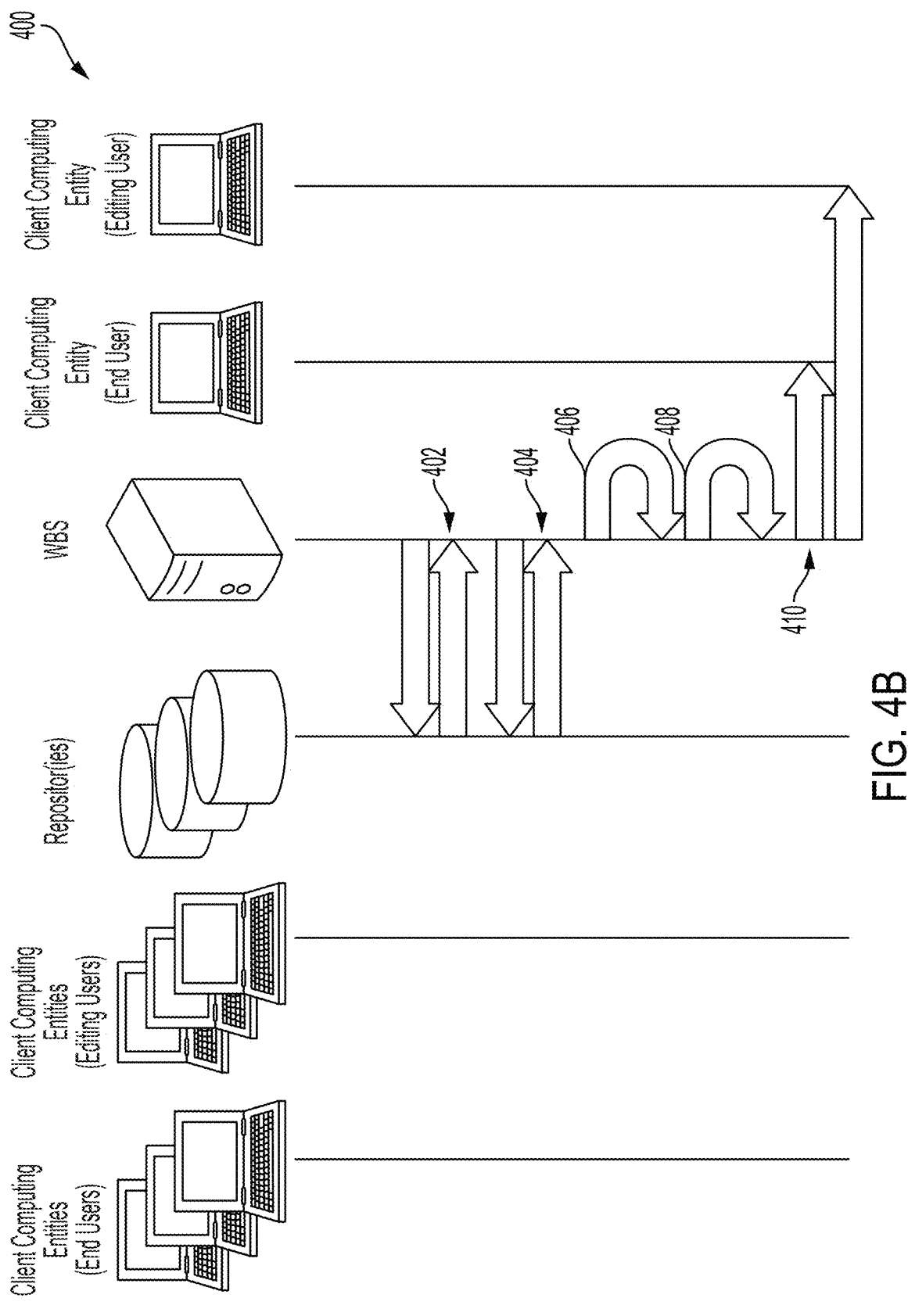
Figure 5A:
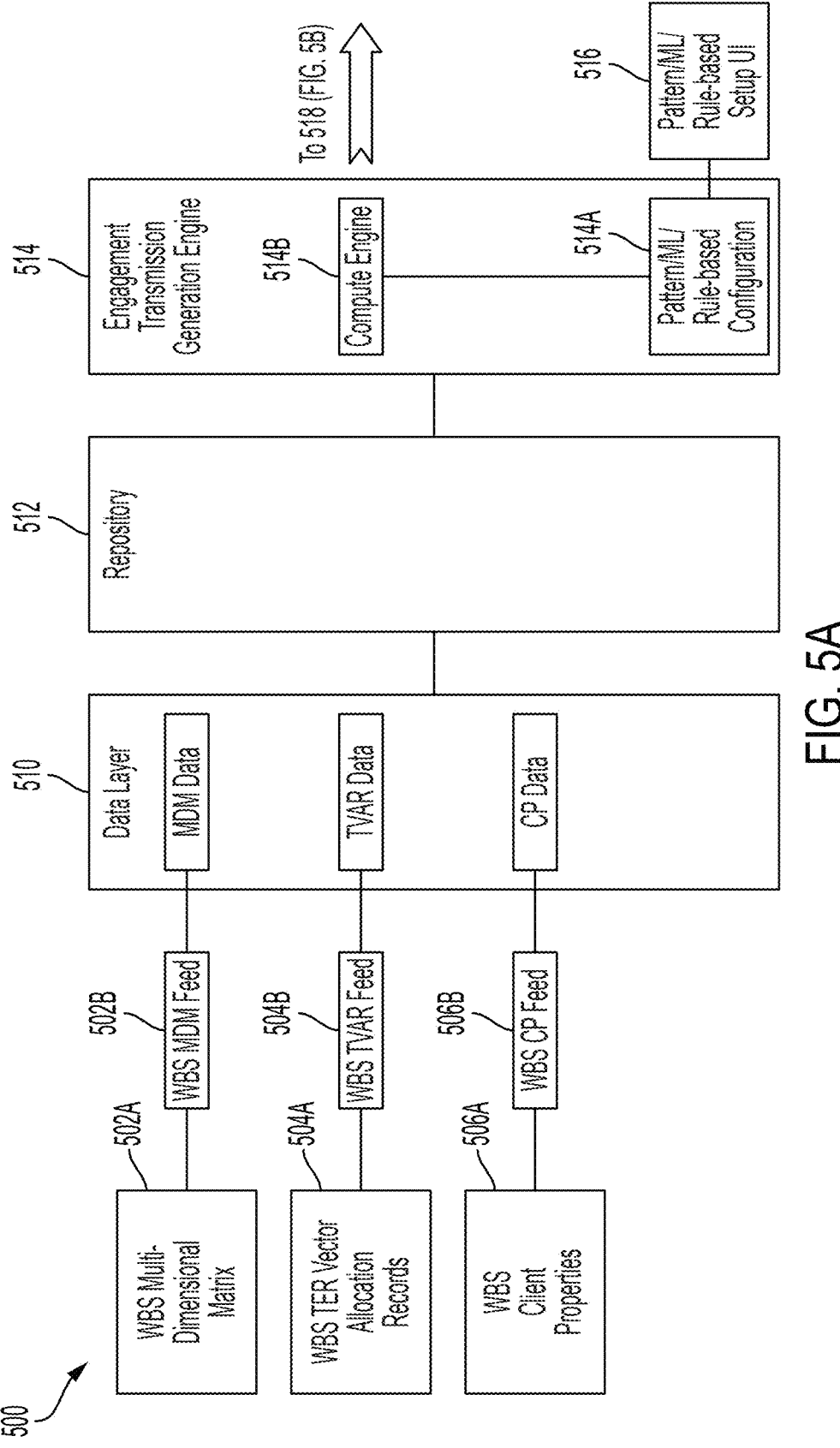
Figure 5B:
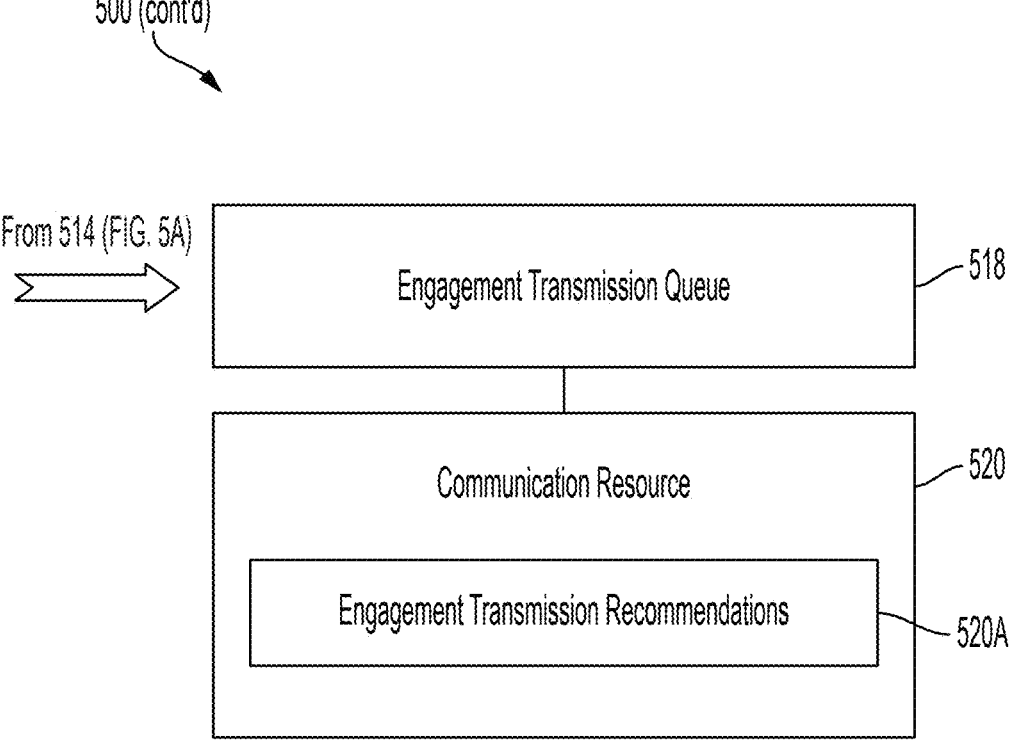
Figure 6B:
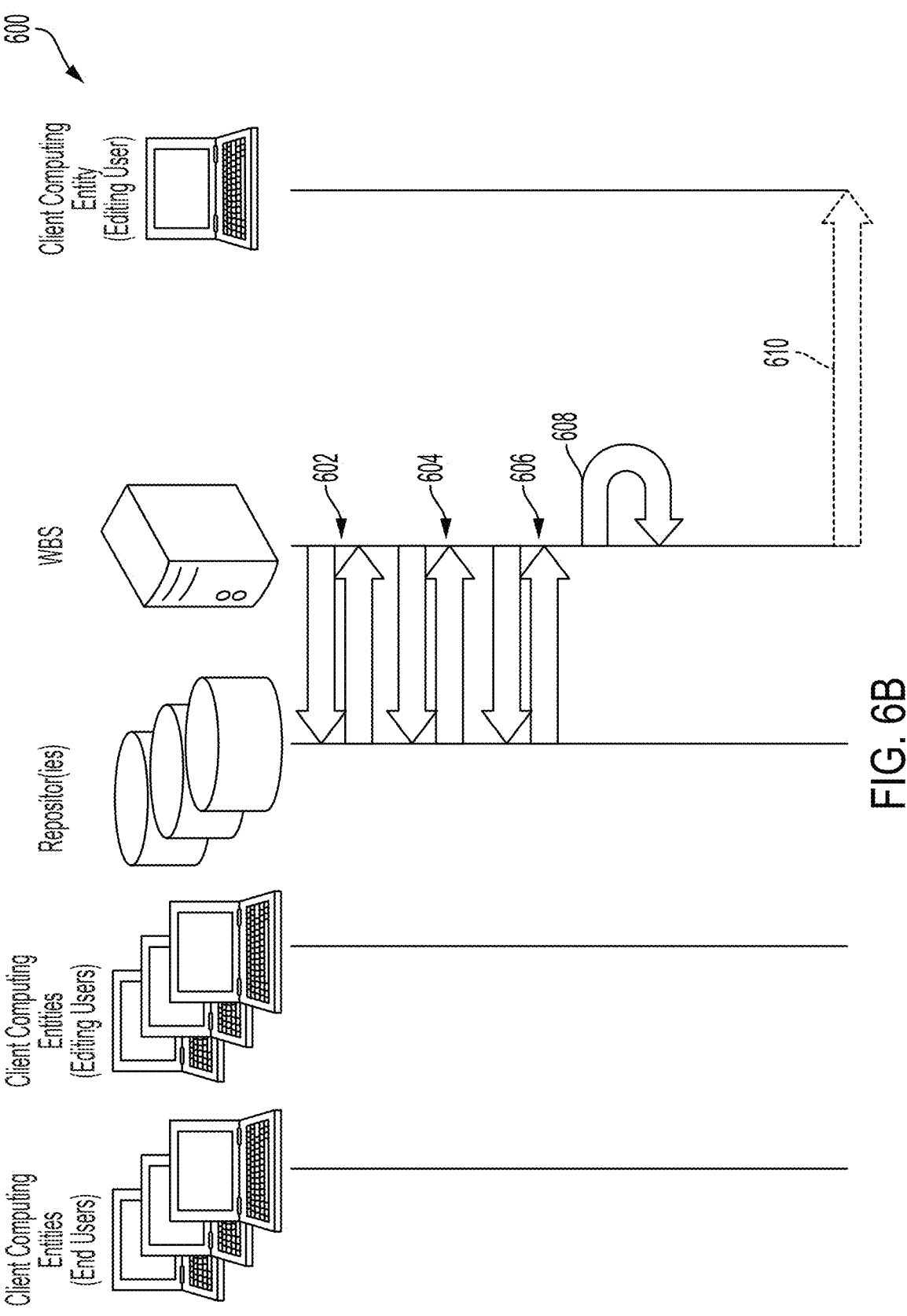
Figure 7A:
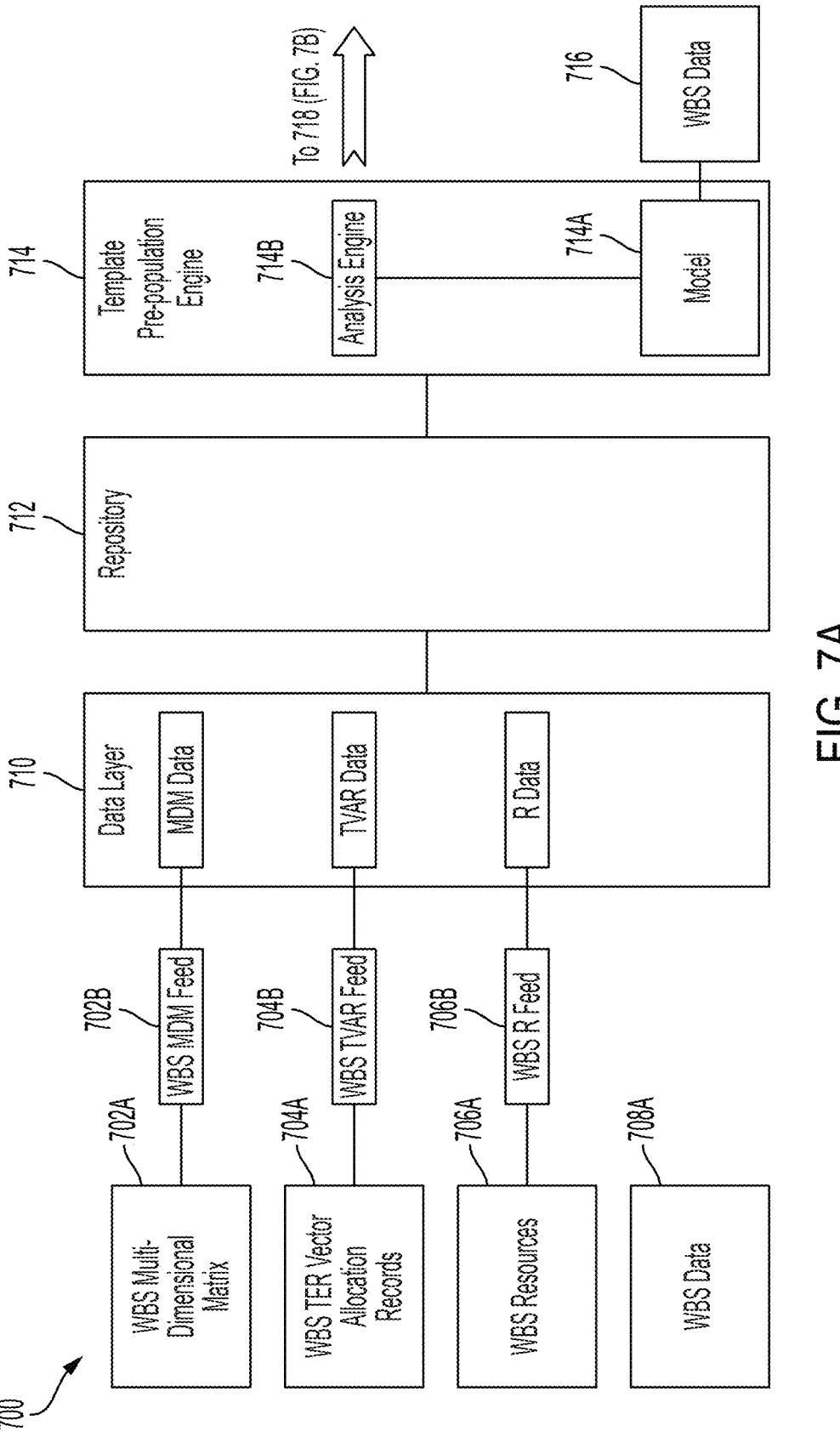
Figure 7B:
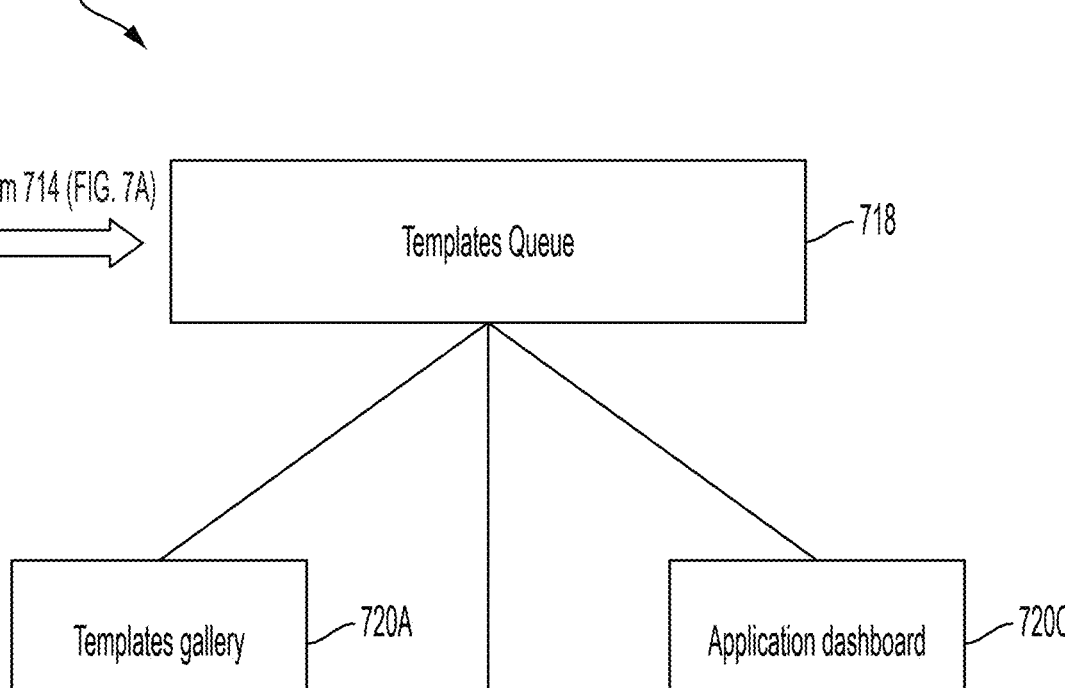
Figure 8:
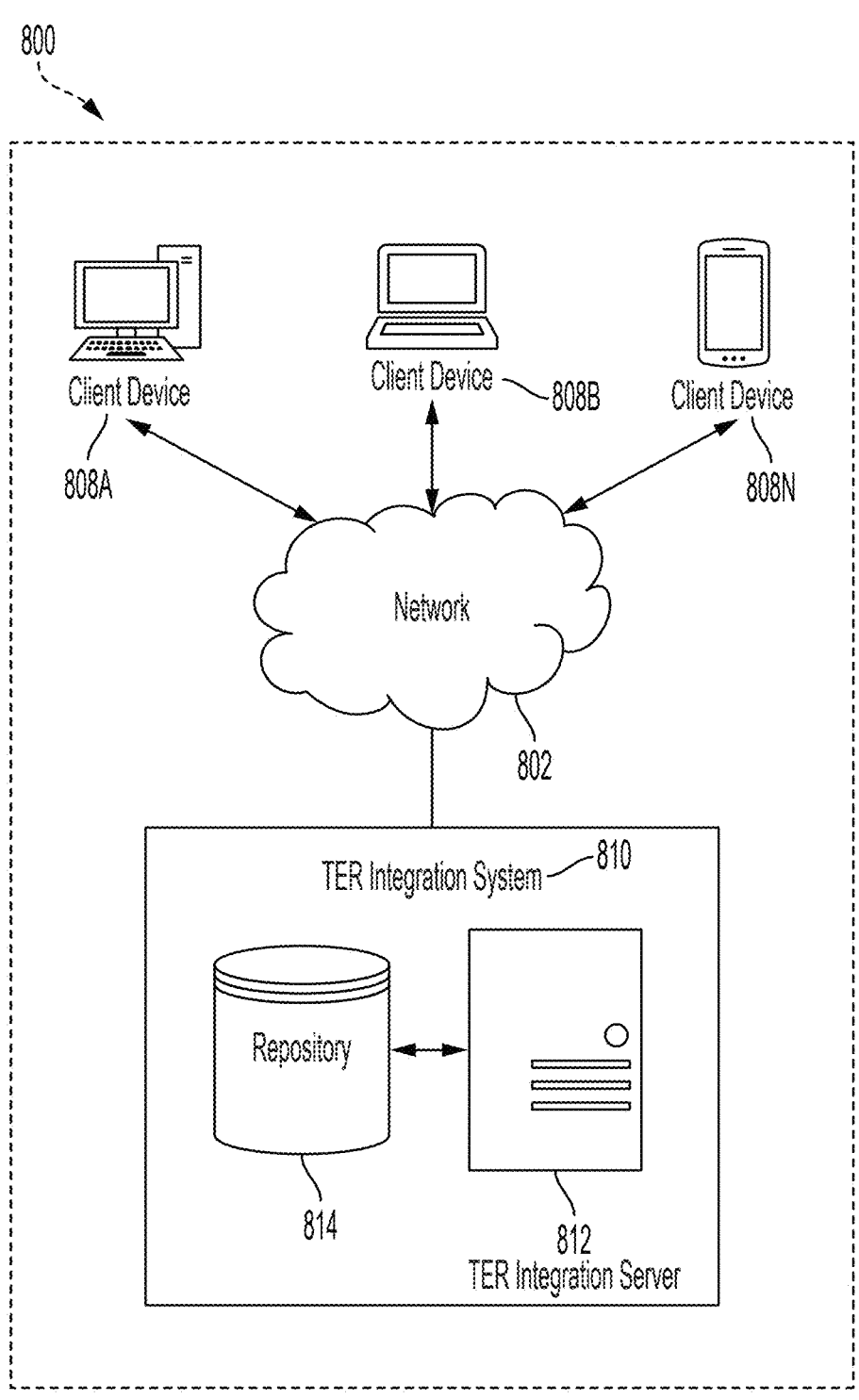
Figure 9:
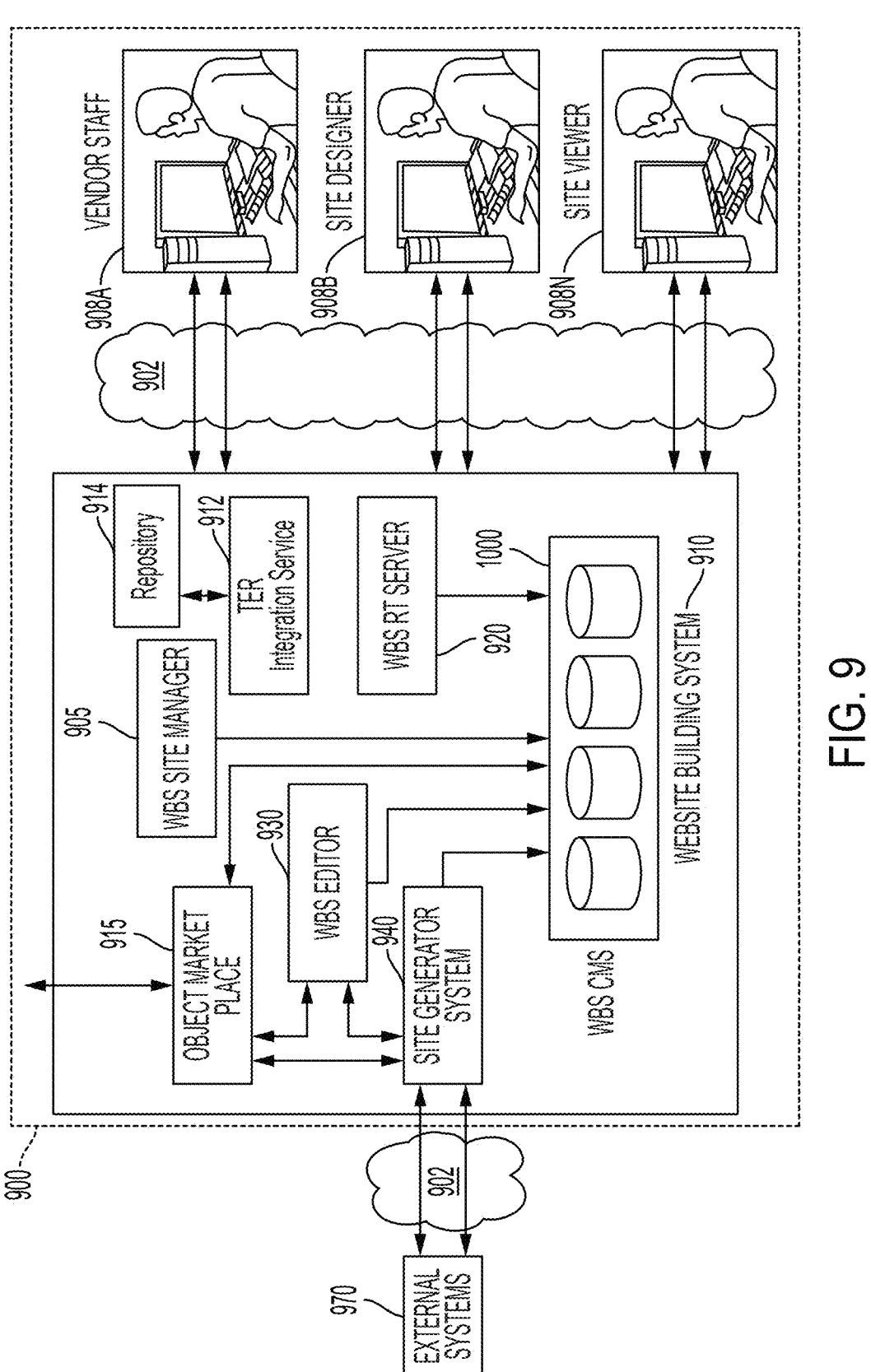
Figure 10:
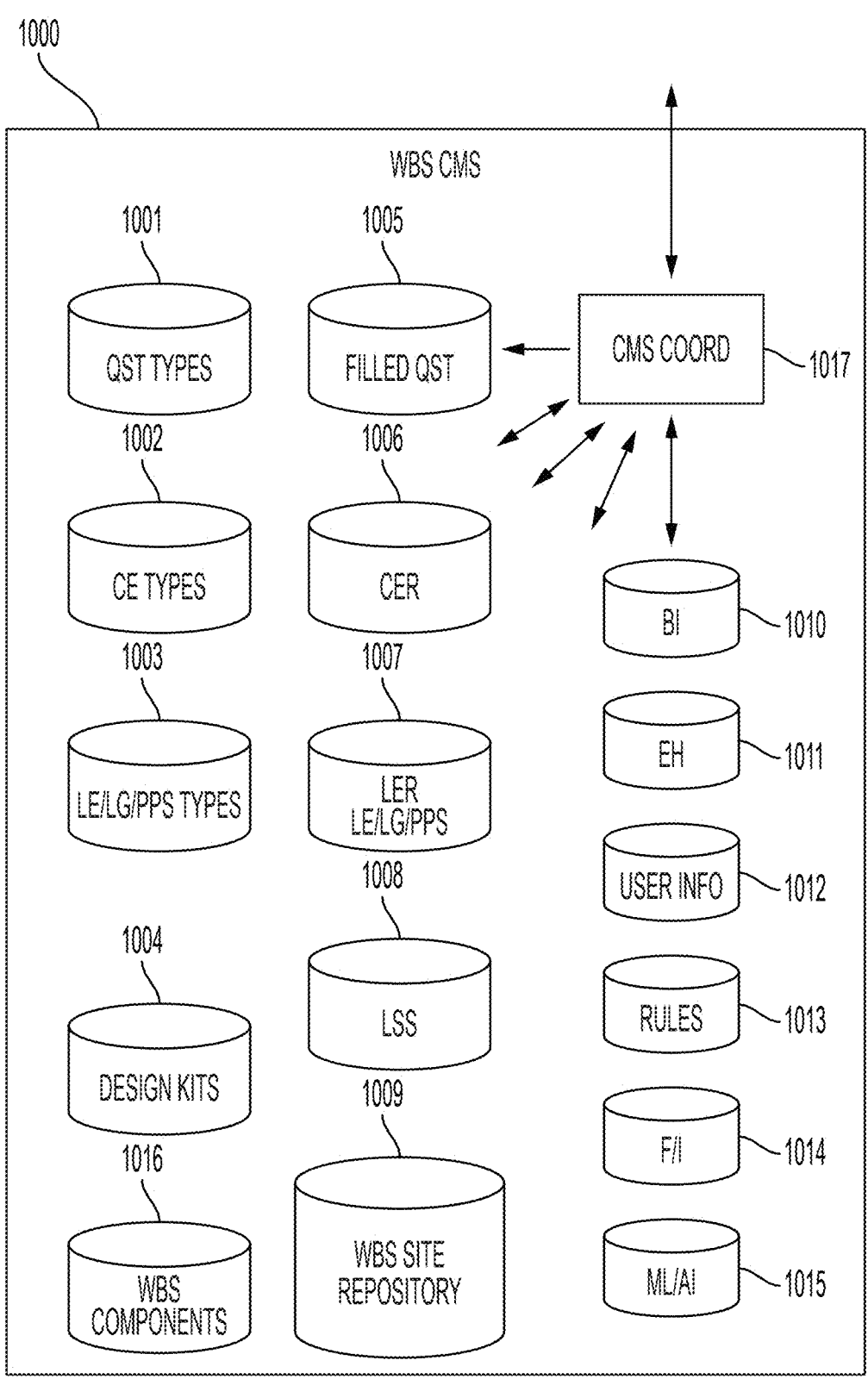
Figure 11:
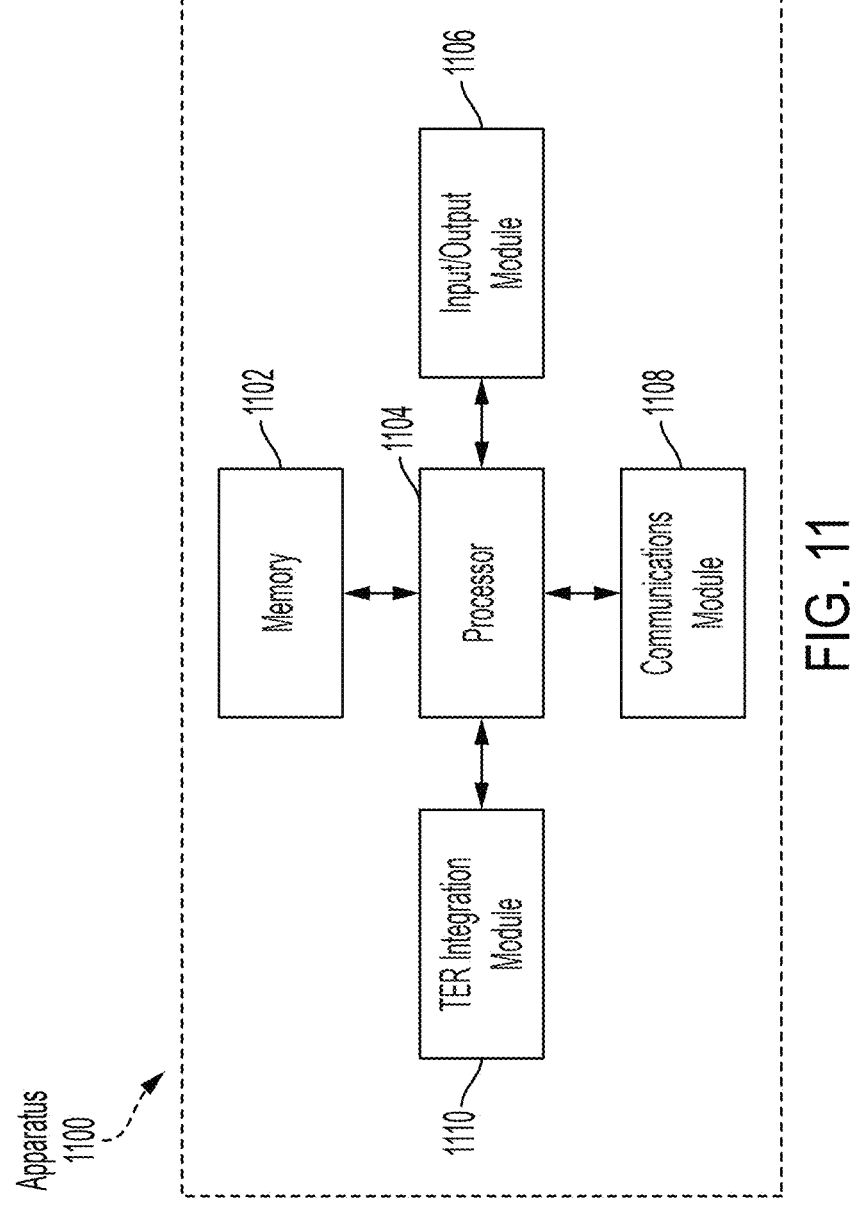
Figure 12:
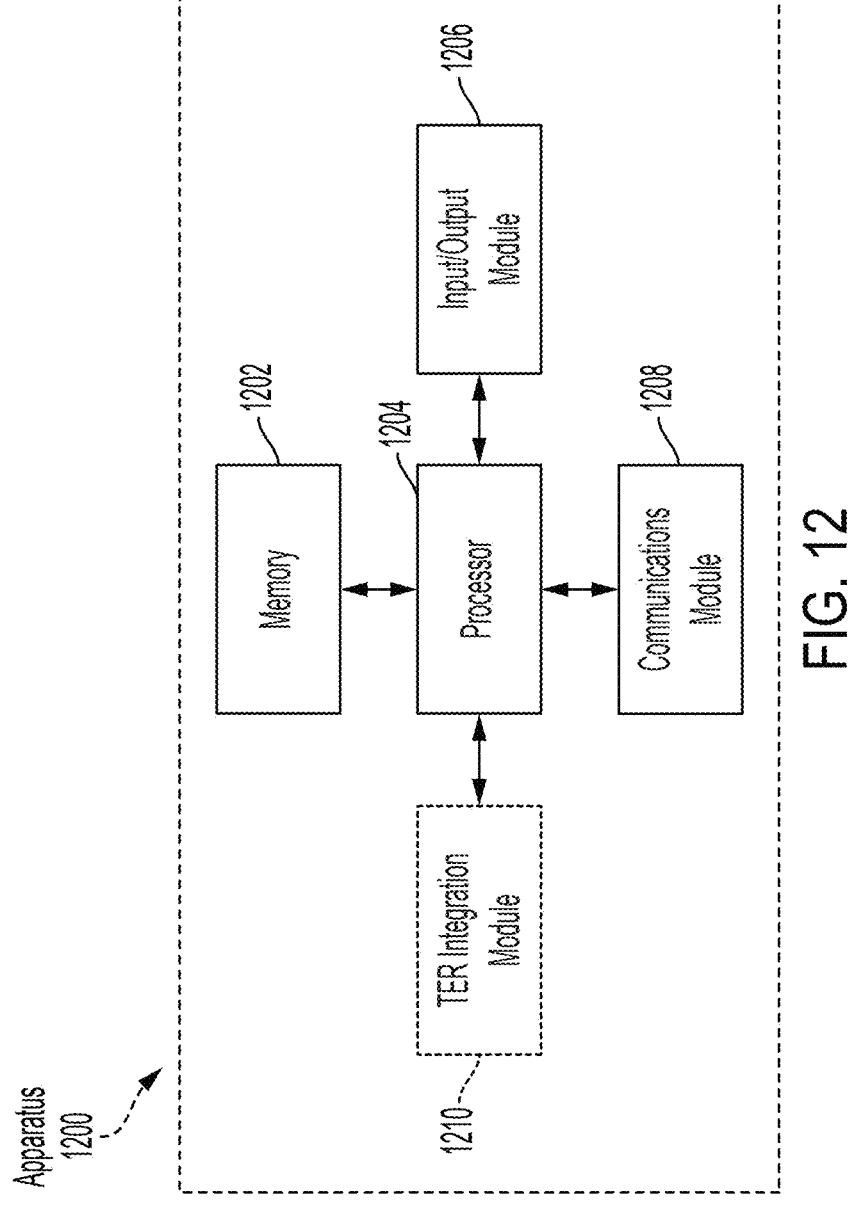

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings. Some embodiments may include the components arranged in a different way:

FIG. 1A illustrates example operations associated with automatically generating temporal external resource (TER) vector allocation recommendations in accordance with some example embodiments described herein;

FIG. 1B illustrates a signal diagram of example operations associated with automatically generating temporal external resource (TER) vector allocation recommendations in accordance with some example embodiments described herein;

FIG. 2A illustrates a schematic block diagram of an example architecture for automatically generating temporal external resource (TER) vector allocation recommendations in accordance with some example embodiments described herein;

FIG. 2B illustrates a schematic block diagram of an example architecture for automatically generating temporal external resource (TER) vector allocation recommendations in accordance with some example embodiments described herein;

FIG. 3A illustrates an example renderable interface configured in accordance with some example embodiments described herein;

FIG. 3B illustrates an example renderable interface configured in accordance with some example embodiments described herein;

FIG. 4A illustrates example operations associated with automatically generating engagement transmissions in accordance with some example embodiments described herein;

FIG. 4B illustrates a signal diagram of example operations associated with automatically generating engagement transmissions in accordance with some example embodiments described herein;

FIG. 5A illustrates a schematic block diagram of an example architecture for automatically generating engagement transmissions in accordance with some example embodiments described herein;

FIG. 5B illustrates a schematic block diagram of an example architecture for automatically generating engagement transmissions in accordance with some example embodiments described herein;

FIG. 6A illustrates example operations associated with automatically generating interface populating operations in accordance with some example embodiments described herein;

FIG. 6B illustrates a signal diagram of example operations associated with automatically generating interface populating operations in accordance with some example embodiments described herein;

FIG. 7A illustrates a schematic block diagram of an example architecture for automatically generating interface populating operations in accordance with some example embodiments described herein;

FIG. 7B illustrates a schematic block diagram of an example architecture for automatically generating interface populating operations in accordance with some example embodiments described herein;

FIG. 8 illustrates a block diagram of an example system that may be specially configured within which embodiments of the present disclosure may operate;

FIG. 9 illustrates a schematic block diagram of example components of an example website building system in accordance with some example embodiments described herein;

FIG. 10 illustrates a schematic block diagram of example repositories of an example content management system of website building system in accordance with some example embodiments described herein;

FIG. 11 is a schematic block diagram of example modules for use in an example server apparatus in accordance with some example embodiments described herein; and FIG. 12 is a schematic block diagram of example modules for use in an example client apparatus in accordance with some example embodiments described herein.

DETAILED DESCRIPTION

One or more example embodiments now will be more fully hereinafter described with reference to the accompanying drawings, wherein like reference numerals are used to refer to like elements throughout. In the following description, for purposes of explanation, numerous specific details are set forth in order to provide a thorough understanding of the various embodiments. It is evident, however, that the various embodiments may be practiced without these specific details (and without applying to any particular networked environment or standard). It should be understood that some, but not all embodiments are shown and described herein. Indeed, the embodiments may be embodied in many different forms, and accordingly, this disclosure should not be construed as limited to the embodiments set forth herein. Rather, these embodiments are provided so that this disclosure will satisfy applicable legal requirements. As used herein, the description may refer to a server or client device as an example "apparatus." However, elements of the apparatus described herein may be equally applicable to the claimed system, method, and computer program product. Accordingly, use of any such terms should not be taken to limit the spirit and scope of embodiments of the present disclosure.

Example embodiments of the present disclosure may proceed to implement temporal external resource (TER) vector allocation integration in a number of ways. Accordingly, various processes in accordance with the present disclosure are described herein. Each method or process described herein may include any number of operational blocks defining the process and/or a portion thereof. It should be appreciated that in some embodiments the various processes and/or sub-processes described herein may be combined in any manner, such that the embodiment is configured to perform each aspect of the various processes in combination, in parallel and/or serially. In some embodiments, at least one additional and/or at least one alternative operation is performed in one or more of the described processes, and/or at least one operation is removed from one or more of the described processes.

Additionally, optional operations may be depicted in the processes utilizing dashed (or "broken") lines. In this regard, it should be appreciated that the processes described herein are examples only and the scope of the disclosure is not limited to the exact operations depicted and described, and the depicted and described operations should not limit the scope and spirit of the embodiments described herein and covered in the appended claims.

OVERVIEW

Embodiments herein relate to leveraging learnings generated based on multiple sets of unique data to inform various operations, communications, and recommendations. A website building system configured in accordance with embodiments herein is in continuous receipt of data from disparate sources, and the data is innovatively leveraged herein to inform real-time operations, communications, and recommendations associated with the particular website. For example, a first source of data available to a website building system includes historical editing interactions (e.g., website component selections) and associated metadata (e.g., timestamps associated with selections, delays associated with selections, mouse clicks, cursor positionings, etc.) for any given website identifier associated with a website assembled using the website building system by a client computing device associated with an editing user identifier. This first source of data, if leveraged properly and efficiently (e.g., while the data remains fresh and relevant), may provide valuable insights into optimal electronic behaviors associated with a given editing user identifier. By way of further example, a second source of data available to the website building system includes end-user interaction data, representing electronic interactions (e.g., mouse clicks, cursor positions or hoverings, traversals through pages of a website, structure of the website, location of the booking widgets within the website, design layouts of widgets, etc.) performed by client computing devices accessing any given website assembled using the website building system. This second source of data, if leveraged properly and efficiently (e.g., while the data remains fresh and relevant), may provide valuable insights into maximizing allocation of temporal external resource (TER) vectors of a multi-dimensional matrix, or maximizing engagement, associated with a website identifier when a particular end-user identifier accesses the associated website.

Efficiently processing and leveraging at least the aforementioned sources of data is a computationally difficult task, given the large amount of data and how often it is refreshed. Embodiments herein apply machine learning models and/or rules-based models to the data to learn relationships among the data, which in turn informs embodiments herein as to which items of data are most useful when making a particular decision. Knowledge of the most useful items of data when making a particular decision enables embodiments herein to make more efficient use of computing resources because less useful items of data may be ignored.

Example Temporal External Resource Allocation Operation Overview and Embodiments Embodiments herein relate to temporal external resource (TER) allocation operations associated with a multi-dimensional TER matrix associated with a website identifier. In addition to the aforementioned improvements, maximizing TER vector allocations associated with a multi-dimensional TER matrix for a given website identifier reduces wasted computing resources associated with unsuccessful (e.g., negative engagement) TER vector allocations. Computing and network resources are wasted when TER vector allocations are completed but ultimately unsuccessful, or when additional electronic communications are required due to confusion over the TER vector allocations. Embodiments herein make more efficient use of computing and network resources by ensuring TER vector allocations are executed at the appropriate time and with the appropriate details, and not based on approximations.

Turning now to FIGS. 1A and 1B, example operations are shown for automatically generating electronic temporal external resource (TER) vector allocation recommendations. The operations illustrated in FIGS. 1A and 1B may, for example, be performed by one or more client devices 808A-N, which may include means, such as memory 1202, processor 1204, input/output module 1206, communications module 1208, TER integration module 1210, and/or the like, which are collectively configured for TER integration. The operations may further be performed by a TER integration server 812, which may include means, such as memory 1102, processor 1104, input/output module 1106, communications module 1108, TER integration module 1110, and/or the like, which are collectively configured for TER integration.

In some embodiments, shown in FIGS. 1A and 1B, at step/operation 102, a process 100 includes retrieving a website identifier associated with a website assembled based at least in part on one or more website building repositories. In embodiments, the website identifier is selected from a plurality of website identifiers and the website identifier is associated with an editing user identifier of a plurality of editing user identifiers. In embodiments, the one or more website building repositories store one or more website building tools and one or more website editing historical interactions associated with the plurality of editing user identifiers.

In some embodiments, the one or more website building tools comprise one or more of pages, sub-pages, containers, components, atomic components, content elements, layout elements, templates, or layout rules.

In some embodiments, shown in FIGS. 1A and 1B, at step/operation 104, the process 100 includes retrieving end-user data from an end-user data corpus (e.g., from a repository 814) comprising electronic interaction data associated with a first end-user identifier of a plurality of end-user identifiers. In some embodiments, the end-user data associated with the first end-user includes one or more electronic interactions performed by a first client computing device associated with the first end-user identifier accessing one or more website assembled based at least in part on the one or more website building repositories.

In some embodiments, shown in FIGS. 1A and 1B, at step/operation 106, the process 100 includes retrieving a multi-dimensional TER matrix (e.g., from repository 814) maintained by the website building system and associated with the website identifier, where the multi-dimensional TER matrix comprises a plurality of TER vectors.

In some embodiments, shown in FIGS. 1A and 1B, at step/operation 108, the process 100 includes, based at least in part on applying one or more trained machine learning models or one or more rule-based models to historical editing interactions associated with the editing user identifier and the end-user data, selecting a TER vector from the multi-dimensional TER matrix. In some embodiments, the one or more trained machine learning models are trained using historical editing interactions associated with the plurality of editing user identifiers assembling websites based at least in part on the one or more website building repositories and end-user data associated with a plurality of end-user identifiers comprising one or more of electronic interactions performed by a plurality of client computing devices associated with the plurality of end-user identifiers accessing one or more websites assembled based at least in part on the one or more website building repositories.

In some embodiments, the one or more trained machine learning models are configured to select the TER vector, based at least in part on the historical editing interactions associated with the editing user identifier and the end-user data. The TER vector is selected in accordance with a first programmatically generated likelihood that a TER allocation operation will be executed in accordance with the TER vector for the end-user identifier and the website identifier and a second programmatically generated likelihood that the TER allocation operation will be associated with a positive engagement indicator.

In some embodiments, the one or more rules-based models are configured to select a TER vector, based at least in part on the historical editing interactions associated with the editing user identifier and the end-user data, where the TER vector is identified in accordance with learned rules.

In some embodiments, the TER vector is further selected based at least in part on maximizing booking vector allocations for the multi-dimensional TER matrix, an expected currency value associated with a TER vector allocation for the TER vector and the end-user identifier, or whether the TER vector is associated with an in-progress event.

In some embodiments, shown in FIGS. 1A and 1B, at step/operation 110, the process 100 includes generating an electronic TER vector allocation recommendation interface according to the TER vector.

In some embodiments, shown in FIGS. 1A and 1B, at step/operation 112, the process 100 includes transmitting the electronic TER vector allocation recommendation interface to a client computing device associated with the first end-user identifier or the editing user identifier.

In some embodiments, a TER vector comprises a plurality of TER vector records, and a TER vector record of the plurality of TER vector records comprises one or more of an event identifier, an event type identifier, an event time, or an event location.

In some embodiments, the one or more electronic interactions comprise one or more TER vector allocations associated with the end-user identifier and the website identifier, the one or more TER vector allocations are associated with an engagement indicator, and the engagement indicator is one of positive, negative, or partial.

In some embodiments, the user identifier is associated with a plurality of TER vector allocations associated with the website identifier, and every TER vector allocation of the plurality of TER vector allocations is associated with a positive engagement indicator.

In some embodiment, the end-user data further includes electronic interaction data received from a remote computing device associated with the website identifier, where a remote computing device is one of a point-of-sale terminal, or a sensor device.

In some embodiments, a TER vector allocation operation is automatically executed, in accordance with the TER vector. In such examples, an availability record associated with the TER vector is transformed to reflect the TER vector allocation and the multi-dimensional TER matrix is synchronized with a second multi-dimensional TER matrix that may be configured for rendering via the website.

It will be appreciated that, in addition to the historical editing interactions, the one or more machine learning models or one or more rules-based models may be applied to features or dimensions of the website, including data on an industry associated with the website, a geographic location associated with the website, applications or microservices used by the website, services provided by the website, and more.

It will further be appreciated that a plurality of TER vectors may be ranked, using the one or more machine learning models or the one or more rules-based models, such that multiple TER vectors may be presented according to a ranked order for selection.

FIGS. 2A and 2B illustrate a schematic block diagram of an example architecture 200 for automatically generating electronic booking recommendations in accordance with some example embodiments described herein. In FIG. 2A, an example architecture 200 includes a data layer 210, which maintains and aggregates data from a plurality of sources. In the example shown in FIG. 2A, the data sources include multi-dimensional TER matrix (MDTM) data 202A (provided to data layer 210 via MDTM feed 202B) (e.g., calendar data), TER vector allocation records (TVAR) data 204A (provided to data layer 210 via TVAR feed 204B) (e.g., booking data), catalog records (CR) data 206A (provided to data layer 210 via CR feed 206B) (e.g., catalog data), and website properties and components (WP/C) data 208A (provided to data layer 210 via WP/C feed). For example, the MDM data may include data associated with upcoming sessions (e.g., TER vectors) available for each website, the WP/C data may include data regarding a geographic location and segment associated with each website, and the TVAR data may include data associated with participants in and price for each session (e.g., TER vector allocation). The data layer 210 transmits and receives data to and from the repository 212.

In FIG. 2A, the example architecture 200 further includes a TER vector selection engine 214, which may include an ML/rule-based/pattern-based configuration or model 214A and a computing engine 214B. The TER vector selection engine 214 receives data from the repository 212, as well as optionally settings from an ML/rule-based/pattern-based setup user interface 216. The compute engine 214B in conjunction with the configuration or model 214A generates TER vector selections, allocations, or allocation recommendations and provides them to a TER allocation recommendation queue 218. In some examples, the setup user interface 216 may be configured to receive configuration settings for the TER vector selection engine 214.

Continuing to FIG. 2B, the example architecture 200 further includes a TER allocation recommendation queue 218, including a queue where TER vector allocation recommendations may be held and released to a communication resource 220 according to relevancy and timing.

Also shown in FIG. 2B, the communication resource 220 provides TER vector allocation operations 220A (e.g., for automatic execution of TER vector allocation operations) or TER vector allocation recommendation transmissions 220B. For example, the transmissions 220B may include widgets, emails, SMS messages, and may require approval by an editing user identifier associated with a website identifier before the allocation operation is executed. In some examples, a TER vector allocation recommendation transmission 220B may include a suggestion that an editing user identifier must approve before being transmitted (e.g., adding a new class session at a suggested time, increasing service prices) or may include an automatic transmission (e.g., sending emails to end users to sign up in an empty slot).

In other embodiments, the website building system may be configured to provide temporal external resource (TER) integration for requesting entities that assembled their electronic products outside of the website building system (e.g., via an API). For example, the system may receive a TER vector allocation recommendation request, where the TER vector allocation recommendation request comprises allocation request metadata. The system may extract the allocation request metadata, and, based at least in part on the allocation request metadata, retrieve one or more website identifiers associated with a website assembled based at least in part on the one or more website building repositories. Further based on the allocation request metadata, the system may retrieve end-user data from an end-user data corpus comprising electronic interaction data associated with a first end-user identifier of a plurality of end-user identifiers. The system may then apply one or more trained machine learning models or one or more rule-based models to historical editing interactions associated with the editing user identifier and the end-user data to select a TER vector. The system may then generate an TER vector allocation recommendation according to the TER vector and transmit the TER vector allocation recommendation to a requesting client computing device.

In some of these embodiments, the one or more website identifiers are retrieved based on determined similarities between data associated with the one or more website identifiers and one or more items of the allocation request metadata (e.g., a similarity mapping). The first end-user identifier may also be selected based on determined similarities between data associated with the first end-user identifier and one or more items of the allocation request metadata.

FIG. 3A illustrates an example renderable interface configured in accordance with some example embodiments described herein. In FIG. 3A, a renderable interface 300 depicts an example multi-dimensional TER matrix associated with a website identifier (not shown). The multi-dimensional TER matrix includes a plurality of TER vectors 302A, 302B.

FIG. 3B illustrates an example renderable interface configured in accordance with some example embodiments described herein. In FIG. 3B, a renderable interface 310 depicts an example multi-dimensional TER matrix associated with a website identifier (not shown). The multi-dimensional TER matrix includes a plurality of TER vectors 312A, 312B.

Example Engagement Transmission Generation Methods and Embodiments

Embodiments herein are further related to predicting an engagement level associated with a given end-user identifier with respect to a given website identifier, and to generating engagement transmissions tailored to the given end-user identifier such that engagement with a website associated with the website identifier will improve or increase after receipt of the engagement transmission by the given end-user identifier.

Turning now to FIGS. 4A and 4B, example operations are shown automatically generating recommended engagement transmissions. The operations illustrated in FIGS. 4A and 4B may, for example, be performed by one or more client devices 808A-N, which may include means, such as memory 1202, processor 1204, input/output module 1206, communications module 1208, TER integration module 1210, and/or the like, which are collectively configured for TER integration. The operations may further be performed by a TER integration server 812, which may include means, such as memory 1102, processor 1104, input/output module 1106, communications module 1108, TER integration module 1110, and/or the like, which are collectively configured for TER integration.

In some embodiments, shown in FIGS. 4A and 4B, at step/operation 402, a process 400 includes retrieving a website identifier associated with a website assembled based at least in part on one or more website building repositories. The website identifier is selected from a plurality of website identifiers, and the website identifier is associated with an editing user identifier of the plurality of editing user identifiers. In embodiments, the one or more website building repositories store one or more website building tools and one or more website editing historical interactions associated with a plurality of editing user identifiers. In embodiments, the one or more website building tools comprise one or more of pages, sub-pages, containers, components, atomic components, content elements, layout elements, templates, or layout rules.

In some embodiments, shown in FIGS. 4A and 4B, at step/operation 402, the process 404 includes retrieving end-user data from an end-user data corpus comprising electronic interaction data associated with a plurality of end-user identifiers. The end-user data comprises one or more of electronic interactions performed by a plurality of client computing devices associated with the plurality of end-user identifiers accessing one or more websites assembled based at least in part on the one or more website building repositories.

In some embodiments, shown in FIGS. 4A and 4B, at step/operation 404, the process 400 includes selecting, based at least in part on applying one or more trained machine learning models or rules-based models to the end-user data and website editing historical interactions associated with the website identifier, a first end-user identifier among the plurality of end-user identifiers as an engagement transmission candidate in accordance with an engagement score.

In some embodiments, the one or more trained machine learning models are trained using historical editing interactions associated with the plurality of editing user identifiers assembling websites based at least in part on the one or more website building repositories and end-user data associated with a plurality of end-user identifiers comprising one or more of electronic interactions performed by a plurality of client computing devices associated with the plurality of end-user identifiers accessing one or more websites assembled based at least in part on the one or more website building repositories.

In some embodiments, the end-user data is further associated with a plurality of TER vector allocations, where every TER vector allocation of the plurality of TER vector allocations is associated with an engagement indicator. In some embodiments, an engagement indicator is positive or negative. In some embodiments, selecting the first end-user identifier is based at least in part on a count of positive engagement indicators.

In some embodiments, the one or more trained machine learning models are configured to generate an engagement score for the first end-user identifier, based at least in part on the historical editing interactions associated with the editing user identifier and the end-user data, where the engagement score represents a programmatically generated likelihood that the client computing device associated with the first end-user identifier will engage with the website after having received the engagement transmission. In some embodiments, selecting the first end-user identifier is based at least in part on the engagement score exceeding an engagement score threshold.

In some embodiments, the one or more rules-based models are configured to select the first end-user identifier, based at least in part on the historical editing interactions associated with the editing user identifier and the end-user data, where the first end-user identifier is identified in accordance with learned rules.

In some embodiments, shown in FIGS. 4A and 4B, at step/operation 406, the process 400 includes generating an engagement transmission based on the first-end user identifier and the website identifier. In some embodiments, the engagement transmission includes an electronic communication. In some embodiments, the electronic communication includes an electronic incentive, an event type change, or an event time change.

In some embodiments, shown in FIGS. 4A and 4B, at step/operation 408, the process 400 includes transmitting the engagement transmission to a client computing device associated with the first end-user identifier.

Optionally, in some embodiments, a TER vector allocation operation is automatically executed based at least in part on the engagement transmission.

FIGS. 5A and 5B illustrate a schematic block diagram of an example architecture 500 for automatically generating recommended engagement transmissions in accordance with some example embodiments described herein. In FIG. 5A, an example architecture 500 includes a data layer 510, which maintains and aggregates data from a plurality of sources. In the example shown in FIG. 5A, the data sources include multi-dimensional TER matrix (MDTM) data 502A (provided to data layer 510 via MDTM feed 502B) (e.g., calendar data), TER vector allocation records (TVAR) data 504A (provided to data layer 510 via TVAR feed 504B) (e.g., bookings data), and client properties (CP) data 506A (provided to data layer 510 via CP feed 506B) (e.g., client information such as geographic location, city, language, services, and/or the like). The data layer 510 transmits and receives data to and from the repository 512.

In FIG. 5A, the example architecture 500 further includes an engagement transmission generation engine 514, which may include an ML/rule-based/pattern-based configuration or model 514A and a computing engine 514B. The engagement transmission generation engine 514 receives data from the repository 512, as well as optionally settings from an ML/rule-based/pattern-based setup user interface 516. The engagement transmission generation engine 514 may include one or more trained machine learning models, including, for example, a first model configured to determine an engagement score associated with an end-user identifier (e.g., predicts a client's likelihood to churn, accepts client features as input (last class attendance, how many classes attended, how many didn't show up, how did the client join in the first place), and outputs its likelihood to churn at the current moment). The engagement transmission generation engine 514 may further include a second model (e.g., a recommendation system model trained based on previous client behavior, and what correlates to a client staying & returning). For example, clients that purchased a membership are more likely to be retained, and clients that got offered a coupon for a new type of class to try are more likely to stay longer. The second model receives features on each client and business as input and tries to match either the client with similar clients or the business with similar businesses and give optimization recommendations (e.g., "offer this client to buy a membership with a discount," "reach out to this client").

The compute engine 514B in conjunction with the configuration or model 514A generates engagement transmissions and provides them to an engagement transmission queue 518.

Continuing to FIG. 5B, the example architecture 500 further includes the engagement transmission queue 518, including a queue where engagement transmissions may be held and released to a communication resource 520 according to relevancy and timing. Also in FIG. 5B, the communication resource 520 provides for engagement transmissions 520A.

Example Interface Populating Operation Methods and Embodiments

Embodiments herein further relate to providing interface populating operations, where templates for inclusion in a website may be pre-populated according to machine learning informed recommendations during a website building process within a website building system. For example, specific interface elements (e.g., prices, content attributes, and the like) may be pre-populated for an editing user identifier based at least in part on applying trained machine learning models to the corpus of data described herein. Pre-populating such interface elements reduces wasted computing resources dedicated to populating interface elements in an unsuccessful or less meaningful manner and having to re-generate one or more interfaces for inclusion in a website. In some embodiments, the one or more interfaces that may be pre-populated are related to TER vector allocations and a multi-dimensional matrix associated with a given website identifier. For the same reasons set forth above with respect to maximizing and optimizing TER vector allocations associated with a multi-dimensional matrix for a given website identifier, embodiments herein enable more efficient use of computing and network resources by providing informed suggestions in a shorter duration of time, while data remains fresh and relevant.

Turning now to FIGS. 6A and 6B, example operations are shown automatically generating pre-populated website building tools. The operations illustrated in FIGS. 6A and 6B may, for example, be performed by one or more client devices 808A-N, which may include means, such as memory 1202, processor 1204, input/output module 1206, communications module 1208, TER integration module 1210, and/or the like, which are collectively configured for TER integration. The operations may further be performed by a TER integration server 812, which may include means, such as memory 1102, processor 1104, input/output module 1106, communications module 1108, TER integration module 1110, and/or the like, which are collectively configured for TER integration.

In some embodiments, shown in FIGS. 6A and 6B, at step/operation 602, a process 600 includes retrieving a website identifier associated with a website assembled based at least in part on one or more website building repositories. The website identifier is selected from a plurality of website identifiers, and the website identifier is associated with an editing user identifier of the plurality of editing user identifiers. In embodiments, the one or more website building repositories store one or more website building tools and one or more website editing historical interactions associated with a plurality of editing user identifiers. In embodiments, the one or more website building tools comprise one or more of pages, sub-pages, containers, components, atomic components, content elements, layout elements, templates, or layout rules.

In some embodiments, shown in FIGS. 6A and 6B, at step/operation 604, the process 600 includes retrieving end-user data from an end-user data corpus comprising electronic interaction data associated with a plurality of end-user identifiers. The end-user data comprises one or more of electronic interactions performed by a plurality of client computing devices associated with the plurality of end-user identifiers accessing one or more websites assembled based at least in part on the one or more website building repositories.

In some embodiments, shown in FIGS. 6A and 6B, at step/operation 606, the process 600 includes retrieving a website vector associated with the website identifier, the website vector comprising a plurality of website records and a resource matrix.

In some embodiments, shown in FIGS. 6A and 6B, at step/operation 608, the process 600 includes based at least in part on applying one or more trained machine learning models or rules based models to the end-user data, website editing historical interactions associated with the website identifier, and the website vector, automatically executing an interface populating operation in accordance with website records of the website vector.

In some embodiments, the one or more trained machine learning models are trained using historical editing interactions associated with the plurality of editing user identifiers assembling websites based at least in part on the one or more website building repositories and end-user data associated with a plurality of end-user identifiers comprising one or more of electronic interactions performed by a plurality of client computing devices associated with the plurality of end-user identifiers accessing one or more websites assembled based at least in part on the one or more website building repositories. The one or more trained machine learning models may be configured to identify the interface populating operation, based at least in part on the historical editing interactions associated with the editing user identifier, the end-user data, and the website vector. In some examples, an interface populating operation may include pre-populating a price, an image, or a booking-related element, or a change in a current user interface that will present the same information.

By way of further example, the one or more trained machine learning models may be configured to suggest templates for services with properties that encapsulate insights drawn from the data the system has (e.g., TVAR data) with respect to numerous businesses using big data and machine learning techniques. The machine learning models learn patterns associated with successful businesses (e.g., number of bookings, gross payments volume (GPV), returning customers) and find common properties for the offered services, as well as other business capabilities and apps available and the type of impact these can make on the business.

The one or more rules-based models may be configured to identify the interface populating operation, based at least in part on the historical editing interactions associated with the editing user identifier, the end-user data, and the website vector, in accordance with learned rules.

In embodiments, the process may optionally include presenting an output of the interface populating operation for inclusion in the website. The process may optionally include the output in the website upon receiving electronic approval from a client computing device. In embodiments, the interface populating operation comprises generating a new template, updating an existing template, or pre-populating one or more interface elements of a TER vector allocations template for the website identifier.

An interface element comprises one or more of an image, a currency element, or a TER allocation element. A TER allocation element may comprise a selectable icon for completing a TER allocation operation in accordance with a TER vector, or a menu icon for completing a TER allocation operation in accordance with a TER vector.

In embodiments, the resource matrix comprises a plurality of TER vectors.

In some embodiments, the one or more machine learning models are configured as clustering models. The clustering models may cluster website identifiers according to website records of a website vector associated with the website identifier.

In embodiments, the interface populating operations enable businesses to make sure they are not offering services that are overpriced or underpriced, or otherwise integrate a pricing engine to recommend prices based on gathered knowledge. The interface populating operations may further enable a business to understand the impact on her business by offering specific business tools and applications, based on the impact this had on similar businesses (e.g., same business segment, same geographic location). The interface populating operations may further enable offering businesses recommendations regarding content (text/images) highlighting the effect it can have on their sales. The interface populating operations may further enable cross-selling of additional services or products.

FIGS. 7A and 7B illustrates a schematic block diagram of an example architecture 700 for automatically generating pre-populated website building tools in accordance with some example embodiments described herein. In FIG. 7A, an example architecture 700 includes a data layer 710, which maintains and aggregates data from a plurality of sources. In the example shown in FIG. 7A, the data sources include multi-dimensional TER matrix (MDTM) data 702A (provided to data layer 710 via MDM feed 702B) (e.g., calendar data), TER vector allocation records (TVAR) data 704A (provided to data layer 710 via TVAR feed 704B) (e.g., bookings data), resources (R) data 706A (provided to data layer 710 via R feed 706B) (e.g., data regarding the number of staff members in the business may allow offering businesses similar in size with flexible pricing rates), and additional data (e.g., geographic data creates a common ground for service-oriented businesses that for some segments (e.g., fitness, beauty, and wellness) are mostly local businesses) (e.g., data that may be derived by accessing a catalog associated with the website, which may include, for example, resource inventory, orders, items/services for sale, and payments) available to the website building system (WBS data 708A). The data layer 710 transmits and receives data to and from the repository 712.

In FIG. 7A, the example architecture 700 further includes a template pre-population engine 714, which may include an ML/rule-based/pattern-based configuration or model 714A and an analysis engine 714B. The template pre-population engine 714 receives data from the repository 712, as well as optionally additional WBS data 716. The analysis engine 714B may include a component that holds the metrics/KPIs that define a successful business per the business vertical and other dimensions, a component that analyzes the input data which was transformed for ML processing, and/or a component that matches data insights from the ML engine and successful business properties (e.g., known metrics associated with business or offerings that have been successful) and creates service template recommendations that are specific per business.

Continuing to FIG. 7B, the example architecture 700 further includes a templates queue 718, from which a templates gallery 720A, TER vector editing interface 720B, and an application dashboard 720C may be accessed.

FIGS. 1A, 1B, 4A, 4B, 6A, and 6B thus illustrate flowcharts and signal diagrams describing the operation of apparatuses, methods, systems, and computer program products according to example embodiments contemplated herein. It will be understood that each flowchart block, and combinations of flowchart blocks, may be implemented by various means, such as hardware, firmware, processor, module, circuitry, and/or other devices associated with execution of software including one or more computer program instructions. For example, one or more of the operations described above may be implemented by an apparatus executing computer program instructions. In this regard, the computer program instructions may be stored by a memory 1102 of the TER integration server 812 and executed by a processor 1104 of the TER integration server 812.

As will be appreciated, any disclosed computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, may be implemented by special purpose hardware-based computer systems which perform the specified functions, or combinations of special purpose hardware with computer instructions.

Definitions

The terms "temporal external resource" or "TER" refer to an external resource (e.g., external to a website building system) that is made available for allocation, by a website building system, via a website assembled using the website building system. A temporal external resource (TER) may be associated with a TER start time and a TER end time, such that the TER is available for allocation for a duration starting at the TER start time and ending at the TER end time. Allocating the TER to an end-user identifier, in accordance with embodiments herein, reserves the temporal external resource for use by the end-user identifier from the TER start time until the TER end time. A TER may be geographic (e.g., a geographic TER) or non-geographic (e.g., a non-geographic TER). A geographic TER is associated with a relative location or physical component, while a non-geographic TER is not associated with a relative location or physical component. In some examples, a TER may be a booking or reservation for an event (e.g., class, program, tutorial, presentation, speech, outing, excursion, service, table, concert, sporting event, or the like), a reservation of an electric vehicle charging station, a reservation of a bike rental or a bike rental docking station, a reservation of a computing resource or a portion of a computing resource, and/or the like.

The term "website building tools" refers to structural objects or electronic building blocks used to assemble a website in accordance with a website building system as described herein. By way of example, website building tools may include pages, sub-pages, containers, components, atomic components, content elements, layout elements, templates, layouts, layout rules, add-on applications, third-party applications, procedural code, application programming interfaces, and the like.

The terms "website editing historical interactions," "editing historical interactions," and "historical editing interactions" refer to electronic interactions performed by client computing devices associated with editing user identifiers in the course of assembling a website in accordance with a website building system as described herein. For example, such interactions may include editing or selections of content, logic, layout, templates, elements, attributes, and/or temporal aspects of the interactions including timing between edits or selections. By way of further example, such interactions may include electronic interactions (e.g., mouse clicks, touch screen selections, cursor hovers, cursor selections, and/or the like) with website building tools, and/or temporal aspects of the interactions including timing between the electronic interactions.

The term "editing user identifier" refers to one or more items of data by which an editing user (e.g., a user building or editing a website using a website building system in accordance with embodiments herein) may be uniquely identified. For example, an editing user identifier may comprise one or more of ASCII text, encryption keys, identification certificates, a pointer, an IP address, a URL, a MAC address, a memory address, an object signature, a HASH value, or other unique identifier, or combinations thereof.

The terms "electronic TER recommendation interface" or "electronic TER vector allocation recommendation interface" or "electronic TER allocation recommendation interface" refer to a computing environment that is configured to display one or more interface elements representative of data associated with TER recommendations or TER vector allocation operations.

The term "website identifier" refers to one or more items of data by which a website may be uniquely identified. For example, a website identifier may comprise one or more of ASCII text, encryption keys, identification certificates, a pointer, an IP address, a URL, a MAC address, a memory address, an object signature, a HASH value, or other unique identifier, or combinations thereof.

The term "end-user data" refers to electronic interaction data associated with a plurality of end-user identifiers accessing a plurality of websites assembled in accordance with a website building system as defined herein.

The term "end-user identifier" refers to one or more items of data by which an end-user (e.g., a user accessing or interacting with a website assembled using a website building system in accordance with embodiments herein) may be uniquely identified. For example, an end-user identifier may comprise one or more of ASCII text, encryption keys, identification certificates, a pointer, an IP address, a URL, a MAC address, a memory address, an object signature, a HASH value, or other unique identifier, or combinations thereof.

The term "electronic interaction data" refers to electronic interactions performed by client devices with electronic interfaces (e.g., websites). Electronic interaction data may include interactions with a touch screen, mouse clicks, cursor positions, cursor hoverings, and the like. Electronic interaction data may further be associated with metadata, such as timestamps at a time which the electronic interaction occurred, such that the electronic interaction data includes temporal aspects.

The terms "multi-dimensional matrix" and "multi-dimensional TER matrix" refer to a data structure having multiple dimensions (e.g., columns and rows, where the intersection of a column and row may represent a TER vector available for allocation to an end-user identifier). In some examples, a multi-dimensional matrix includes more than two dimensions. In some examples, a multi-dimensional matrix represents a calendar of availability associated with a website identifier and a TER vector may represent a scheduling slot associated with a calendar of availability. The multi-dimensional matrix may be implemented in a wide variety of ways such as, linked lists, matrices, hash table, binary and non-binary trees, and/or the like, and/or any combination of the foregoing. In some embodiments, a multi-dimensional matrix may include a multi-dimensional booking matrix.

The term "TER vector" refers to a data structure representative of a vector of a multi-dimensional matrix, where the TER vector includes a plurality of TER vector records. In some examples, a TER vector may include data representative of a calendar slot associated with a website identifier. By way of further example, a TER vector record may include data associated with the TER vector, including a TER identifier, a start time, a stop time, and, optionally, a location component. A TER vector record may include data representative of an instructor associated with a TER vector, a price associated with the TER vector, and/or the like. In some embodiments, a TER vector is a booking vector.

The term "trained machine learning model" refers to a machine learning task. Machine learning is a method used to devise complex models and algorithms that lend themselves to prediction. A machine learning model is a computer-implemented algorithm that may learn from data with or without relying on rules-based programming. These models enable reliable, repeatable decisions and results and uncovering of hidden insights through machine-based learning from historical relationships and trends in the data. In some embodiments, the machine learning model is a clustering model.

A machine learning model is initially fit or trained on a training dataset (e.g., a set of examples used to fit the parameters of the model). The model may be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted. The model fitting may include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). In some embodiments, the model can be trained and/or trained in real-time (e.g., online training) while in use.

The terms "rule-based model" and "rules-based model" refer to a data construct configured to programmatically make decisions based on rules associated therewith. The rules may be learned or curated over time based on a data corpus according to embodiments herein.

A trained machine learning model and/or a rules-based model, according to embodiments herein, may be configured to optimize TER vector allocations associated with a multi-dimensional TER matrix according to whether end-users are likely to agree with and/or approve of the TER vector allocation. A trained machine learning model and/or a rules-based model, according to embodiments herein, may be configured to optimize TER vector allocations associated with a multi-dimensional TER matrix according to what TER vector allocation is most profitable to provide. A trained machine learning model and/or a rules-based model, according to embodiments herein, may be configured to optimize TER vector allocations associated with a multi-dimensional TER matrix according to load balancing across other external resources (e.g., distributing load evenly across the day, the staff, available facilities, available resources, and the like).

The term "TER vector allocation" refers to allocation of a TER vector to a particular end-user identifier such that the TER vector is no longer available for allocation to another end-user identifier. Examples of a TER vector allocation can include, in some embodiments, scheduling of a calendar slot for a particular end-user identifier, reserving an electric vehicle charging location for an end-user identifier associated with an electric vehicle, reserving a docking station for an end-user identifier associated with a bicycle rental, or reserving a computing resource for a particular computing task. In some embodiments, a TER vector allocation is a booking vector allocation.

The terms "TER allocation operation" and "TER vector allocation operation" refer to electronically transforming at least one record (e.g., an availability record or flag) of a TER vector in a repository based on the fact that the TER vector has been allocated to a particular end-user identifier and is no longer available for allocation to another end-user identifier. A TER allocation operation or TER vector allocation operation may be performed automatically, substantially instantaneously, after a TER vector allocation is suggested or recommended in accordance with embodiments herein. Alternatively, a TER allocation operation or TER vector allocation operation may be performed in response to receiving an approval selection associated with the TER vector allocation from a client device associated with an end-user identifier. In some embodiments, a TER allocation operation is a booking vector allocation operation.

The term "engagement indicator" refers to one or more items of data indicating whether there was positive, negative, or partial engagement with respect to a TER vector associated with an end-user identifier. For example, a positive engagement indicator may be associated with an end-user identifier completing a transaction or arriving at a start time associated with a TER vector. A negative engagement indicator may be associated with an end-user identifier not completing a transaction or not arriving during a window of time associated with a TER vector. A partial engagement indicator may be associated with an end-user identifier partially completing a transaction or arriving late during a window of time associated with a TER vector. In some examples, an engagement indicator indicates whether an event was attended (e.g., on time or late) by a user or if the user was a no-show.

The term "event identifier" refers to one or more items of data by which an event may be uniquely identified. For example, an event identifier may comprise one or more of ASCII text, encryption keys, identification certificates, a pointer, an IP address, a URL, a MAC address, a memory address, an object signature, a HASH value, or other unique identifier, or combinations thereof.

The term "event type identifier" refers to one or more items of data by which an event type may be uniquely identified. For example, an event type identifier may comprise one or more of ASCII text, encryption keys, identification certificates, a pointer, an IP address, a URL, a MAC address, a memory address, an object signature, a HASH value, or other unique identifier, or combinations thereof. In some examples, an event type identifier may indicate that an event is a class, a program, a tutorial, a presentation, a speech, an outing, an excursion, a charging slot, or a computing resource.

The term "TER start time" refers to a network timestamp associated with a TER vector representative of an intended start time associated with the TER vector. In some examples, the TER start time indicates when an event starts or when an external resource becomes available.

The term "TER end time" refers to a network timestamp associated with a TER vector representative of an intended end time associated with the TER vector. In some examples, the TER end time indicates when an event ends or when an external resource is no longer available.

The term "TER location" refers to a geographic location (e.g., represented using GPS coordinates) associated with a TER vector.

The term "availability record" refers to a record of a TER vector indicating whether the TER is available for allocation or not. For example, if an availability record is empty, the TER vector may be available for allocation. If an availability record is not empty (e.g., a flag is set), the TER vector may not be available for allocation.

The term "engagement transmissions" refers to electronic communications configured to convey engagement recommendations. In some embodiments, the engagement transmission includes an interface including a computing environment that is configured to display one or more interface elements representative of data associated with engagement transmission recommendations. Proposed engagements may include, in some embodiments, TER vector allocations, promotions, outreach (e.g., phone call, email, message), motivational or financial incentives, new event times or locations, new event instructors, new event types, new media experiences at events, and/or the like. Suggested or recommended engagements for an end-user identifier (e.g., a human) may be based at least in part on motivational psychology, while suggested or recommended engagements for a non-human allocation recipient (e.g., an autonomous vehicle, a computing process, etc.) may be based at least in part on reliability or computing restraints. Engagements may be selected based at least in part on sensor data received from IoT devices or other sensors associated with an end-user identifier or other entity.

The term "engagement score" refers to represents a programmatically generated likelihood that the client computing device associated with an end-user identifier will engage with a website after having received an engagement transmission. Whether an end-user identifier will engage with a website after having received an engagement transmission may be based at least in part on, in some embodiments, untimeliness at booked events, untimeliness in payments, missed events, negative feedback, decreasing performance metrics at attended events, and/or the like.

The term "website vector" refers to a data structure having multiple website records (e.g., also data structures) storing data representative of and associated with a website.

The term "resource matrix" refers to a data structure representative of resources and services provided by or available to a website. In some examples, a service or resource provided by or available to a website may include services offered by a service provider.

The term "interface populating operation" refers to a series of one or more instructions that, when executed, result in populating, without input or action on the part of an editing user, one or more interface elements of an interface component (e.g., a template) for inclusion in a website within a website building system. In some examples, an interface populating operation includes pre-populating a template for inclusion in a website being assembled using a website building system such that interface elements are pre-populated according to suggestions or recommendations prepared for an editing user assembling the website.

The term "TER vector allocation recommendation request" refers to an electronic request, including one or more items of data, received from an external computing device or entity for a TER vector allocation recommendation. In some embodiments, the TER vector allocation recommendation request is an API request.

The term "allocation request metadata" refers to one or more items of data accompanying a TER vector allocation recommendation request. In some examples, allocation request metadata may include a website identifier, a user identifier, data associated with a user identifier, multi-dimensional matrix information (e.g., available calendar slots or services), or other data associated with a requesting entity for preparing an allocation recommendation.

The term "TER vector allocation recommendation response" refers to an electronic response, including one or more items of data, configured for transmission to an external computing device or entity (e.g., a requesting client computing device), where the one or more items of data may represent electronic data with recommendations for one or more TER vector allocations. In some embodiments, the TER vector allocation recommendation response is an API response.

The terms "client device", "computing device", "user device", and the like may be used interchangeably to refer to computer hardware that is configured (either physically or by the execution of software) to access one or more of an application, service, or repository made available by a server and, among various other functions, is configured to directly, or indirectly, transmit and receive data. The server is often (but not always) on another computer system, in which case the client device accesses the service by way of a network.

Example client devices include, without limitation, smart phones, tablet computers, laptop computers, wearable devices (e.g., integrated within watches or smartwatches, eyewear, helmets, hats, clothing, earpieces with wireless connectivity, and the like), personal computers, desktop computers, enterprise computers, the like, and any other computing devices known to one skilled in the art in light of the present disclosure. In some embodiments, a client device is associated with a user.

The terms "data," "content," "digital content," "digital content object," "signal", "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media.

Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer may read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

The terms "application," "software application," "app," "product," "service" or similar terms refer to a computer program or group of computer programs designed to perform coordinated functions, tasks, or activities for the benefit of a user or group of users. A software application may run on a server or group of servers (e.g., a physical or virtual servers in a cloud-based computing environment). In certain embodiments, an application is designed for use by and interaction with one or more local, networked or remote computing devices, such as, but not limited to, client devices. Non-limiting examples of an application comprise website editing services, document editing services, word processors, spreadsheet applications, accounting applications, web browsers, email clients, media players, file viewers, collaborative document management services, videogames, audio-video conferencing, and photo/video editors.

In some embodiments, an application is a cloud product. When associated with a client device, such as a mobile device, communication with hardware and software modules executing outside of the application is typically provided via application programming interfaces (APIs) provided by the mobile device operating system.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The terms "illustrative," "example," "exemplary" and the like are used herein to mean "serving as an example, instance, or illustration" with no indication of qualitative assessment or quality level. Any implementation described herein as "exemplary" is not necessarily to be construed as preferred or advantageous over other implementations.

The phrases "in one embodiment," "according to one embodiment," and the like generally mean that the particular feature, structure, or characteristic following the phrase may be included in the at least one embodiment of the present disclosure and may be included in more than one embodiment of the present disclosure (importantly, such phrases do not necessarily refer to the same embodiment).

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "plurality" refers to two or more items.

The term "set" refers to a collection of one or more items.

The term "or" is used herein in both the alternative and conjunctive sense, unless otherwise indicated.

Having set forth a series of definitions called-upon throughout this application, an example system architecture and example apparatus is described below for implementing example embodiments and features of the present disclosure.

Example Computing Systems, Methods, and Apparatuses of the Disclosure

Methods, apparatuses, systems, and computer program products of the present disclosure may be embodied by any of a variety of computing devices. For example, the method, apparatus, system, and computer program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. F 8 illustrates a block diagram of an example system that may be specially configured within which embodiments of the present disclosure may operate. In this regard, FIG. 8 illustrates an overview for a computing system 800 which may include one or more devices and sub-systems that are configured for performing some or all of the various operations and processes described herein. In some examples, such a system 800 implements TER integration within a WBS via a TER integration system 810 in accordance with some embodiments described herein.

The computing system 800 is illustrated with a TER integration system 810 communicably connected via a network 802 to one or more client devices 808A-808B (referred to as "client devices 808"; the depictions in FIG. 8 of "B" client devices are merely for illustration purposes). Said differently, users may access the TER integration system 810 over at least one communications network 802 using one or more of client devices 808. In some embodiments, each of the client devices 808A-B is embodied by one or more user-facing computing devices embodied in hardware, software, firmware, and/or a combination thereof, configured for performing some or all of the TER integration system functionality described herein. That is, the client devices 808A-B may include circuitry, modules, networked processors, a suitable network server, and/or other type of processing device (e.g., a controller or computing device of the client device 808). For example, in some embodiments, a client device 808A-B is embodied by a personal computer, a desktop computer, a laptop computer, a computing terminal, a smartphone, a netbook, a tablet computer, a personal digital assistant, a wearable device, a smart home device, and/or other networked device that may be used for any suitable purpose in addition to performing some or all of the TER integration system functionality described herein. In some example contexts, the client device 808A-B is configured to execute one or more computing programs to perform the various functionality described herein. For example, the client device 808A-B may execute a web-based application or applet (e.g., accessible via a website), a software application installed to the client device 808A-B (e.g., an "app"), or other computer-coded instructions accessible to the client device 808.

In some embodiments, the client devices 808A-B may include various hardware, software, firmware, and/or the like for interfacing with the TER integration system 810. Said differently, a client device 808A-B may be configured to access the TER integration system 810 and/or to render information provided by the TER integration system 810 (e.g., via a software application executed on the client device 808). According to some embodiments, the client device 808A-B comprises a display for rendering various interfaces. For example, in some embodiments, the client device 808A-B is configured to display such interface(s) on the display of the client device 808A-B for viewing, editing, and/or otherwise interacting with at least a selected component, which may be provided by the TER integration system 810.

In some embodiments, the TER integration system 810 includes one or more servers, such as TER integration server 812. For example, TER integration system 810 may implement some of its functionality on a server or a server set (e.g., TER integration server 812), and some of its functionality on client elements (e.g., client devices 808A-B). In some embodiments, the TER integration system 810 dynamically determines whether to perform some functionality on the server or the client platform. In some embodiments, the TER integration system 810 comprises other servers and components, as described below with respect to the exemplary depicted embodiment of a website building system 910 in FIG. 9.

TER integration server 812 may be any suitable network server and/or other type of processing device. In this regard, the TER integration server 812 may be embodied by any of a variety of devices, for example, the TER integration server 812 may be embodied as a computer or a plurality of computers. For example, TER integration server 812 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least a portion of the components illustrated with respect to server apparatus 1100 in FIG. 11 and described in connection therewith. The TER integration server 812 may, in some embodiments, comprise several servers or computing devices performing interconnected and/or distributed functions. Despite the many arrangements contemplated herein, TER integration server 812 is shown and described herein as a single computing device to avoid unnecessarily overcomplicating the disclosure.

In some embodiments, the TER integration server 812 is configured, via one or more software modules, hardware modules, or a combination thereof, to access communications network 802 for communicating with one or more of the client devices 808. Additionally or alternatively, the TER integration server 812 is configured, via software, hardware, or a combination thereof, to is configured to execute any of a myriad of processes associated with the implementing TER integration. Said differently, TER integration server 812 may include circuitry, modules, networked processors, or the like, configured to perform some or all of the TER integration functionality, as described herein. In this regard, for example, in some embodiments, the TER integration server 812 receives and processes data. For example, the client devices 808A-B and/or an application may communicate with the TER integration system 810 (e.g., TER integration server 812) via one or more application programming interfaces (APIs), web interfaces, web services, or the like.

In some embodiments, the TER integration system 810 includes at least one repository, such as repository 814. Such repository(ies) may be hosted by the TER integration server 812 or otherwise hosted by devices in communication with the TER integration server 812. As depicted, in some embodiments, the TER integration server 812 is communicably coupled with the repository 814. In some embodiments, the TER integration server 812 may be located remotely from the repository 814. In this regard, in some embodiments, the TER integration server 812 is directly coupled to the repository 814 within the TER integration system 810.

Alternatively or additionally, in some embodiments, the TER integration server 812 is wirelessly coupled to the repository 814. In yet other embodiments, the repository 814 is embodied as a sub-system(s) of the TER integration server 812. That is, the TER integration server 812 may comprise the repository 814. Alternatively or additionally, in some embodiments, the repository 814 is embodied as a virtual repository executing on the TER integration server 812.

The repository 814 may be embodied by hardware, software, or a combination thereof, for storing, generating, and/or retrieving data and information utilized by the TER integration system 810 for performing the operations described herein. For example, repository 814 may be stored by any suitable storage device configured to store some or all of the information described herein (e.g., memory 1102 of the TER integration server 812 or a separate memory system separate from the TER integration server 812, such as one or more database systems, backend data servers, network databases, cloud storage devices, or the like provided by another device (e.g., online application or 3rd party provider), such as a Network Attached Storage (NAS) device or devices, or as a separate database server or servers). Repository 814 may comprise data received from the TER integration server 812 (e.g., via a memory 1102 and/or processor(s) 1104) and/or a client device 808, and the corresponding storage device may thus store this data. The repository 814 may store various data in any of a myriad of manners, formats, tables, computing devices, and/or the like. For example, in some embodiments, the repository 814 includes one or more sub-repositories that are configured to store specific data processed by the TER integration system 810. Repository 814 includes information accessed and stored by the TER integration server 812 to facilitate the operations of the TER integration system 810.

TER integration system 810 (e.g., TER integration server 812) may communicate with one or more client devices 808A-B via communications network 802. Communications network 802 may include any one or more wired and/or wireless communication networks including, for example, a wired or wireless local area network (LAN), personal area network (PAN), metropolitan area network (MAN), wide area network (WAN), or the like, or combinations thereof, as well as any hardware, software and/or firmware required for implementing the one or more networks (e.g., network routers, switches, hubs, etc.). For example, communications network 802 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network.

Furthermore, the communications network 802 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the TER integration system 810, such as JavaScript Object Notation (JSON) objects sent via a WebSocket channel. In some embodiments, the protocol is JSON over RPC, JSON over REST/HTTP, the like, or combinations thereof.

In some embodiments, the TER integration system 810 is a standalone system. In other embodiments, the TER integration system 810 is embedded inside of a larger editing system. For example, in certain embodiments, the TER integration system 810 is associated with a visual design system and further still, in some embodiments, the visual design system is one or more of a document building system, a website building system, or an application building system.

An example of a TER integration system (e.g., TER integration system 810 as depicted in FIG. 8) is depicted in FIG. 9. In particular, FIG. 9 depicts a computing system 900 including a website building system ("WBS") 910 as an example TER integration system for the creation and/or update of, for example, hierarchical websites.

A WBS 910 may be online (e.g., applications are edited and stored on a server or server set), off-line, or partially online (with web sites being edited locally but uploaded to a central server for publishing). A WBS 910 may be accessed by a variety of users via a network 902, including designers, subscribers, subscribing users or site editors, and code editors, which are the users designing the web sites, as well as end users which are the "users of users" accessing the created web sites. Although end users may typically access the WBS 910 in a read-only mode, a WBS (and web sites) may allow end users to perform changes to a web site, such as adding or editing data records, adding talkbacks to news articles, adding blog entries to blogs, and/or the like.

In some embodiments, a WBS 910 may allow multiple levels of users and different permissions and capabilities may be associated with and/or assigned to each level. For example, users may register with the WBS 910 (e.g., via the WBS server which manages the users, web sites, and access parameters of the end users).

With reference to FIG. 9, in addition to a TER integration service 912, and a repository 914, a WBS 910 may comprise a WBS site manager 905, an object marketplace 915, a RT (runtime) server 920, a WBS editor 930, a site generation system 940 and a WBS content management system 1000. WBS 910 is depicted in communication with embodiments of the client devices 808A-B which are depicted as being operated by WBS vendor staff 908A, WBS site designer 908B (e.g., a user), a site viewer 908N (e.g., a user of a user), as well as external systems 970. For example, WBS vendor staff 908A may be an employee of the pertinent website building system vendor and may create and maintain various WBS elements such as templates, content/layout elements, and/or the like. In some embodiments, a site designer 908B may use WBS 910 to build his site for use by site viewers 908N.

Additionally or alternatively, a site designer 908B may be an external site designer or consultant, though the website building system vendor may employ site designers 908B, for example for the creation of template sites for inclusion in the WBS 910. In some embodiments, site viewers 908N may only view the system. Additionally or alternatively, in some embodiments, site viewers 908N may be allowed some form of site input or editing (e.g., talkback sending or blog article posting). In still further embodiments, WBS 910 comprises a limited site generation system 940 configured to allow a viewer 908N to build (e.g., a user page) within a social networking site. It is contemplated by this disclosure that a site viewer 908N may also include a site designer 908B.

In some embodiments, WBS site manager 905 is used by site designer 908B to manage his created sites (e.g., to handle payment for the site hosting or set permissions for site access). In some embodiments, WBS RT (runtime) server 920 handles run-time access by one or more (e.g., possibly numerous) site viewers 908N. In some embodiments, such access is read-only, but in certain embodiments, such access involves interactions which may affect back-end data or front-end display (e.g., purchasing a product or posting a comment in a blog). In some embodiments, WBS RT server 920 serves pages to site designers 908B (e.g., when previewing the site, or as a front-end to WBS editor 930).

In some embodiments, object marketplace 915 allows trading of objects (e.g., as add-on application, templates, and element types) between object vendors and site designers 908B through WBS 910. In some embodiments, WBS editor 930 allows site designer 908B to edit site pages (e.g., manually or automatically generated), such as editing of content, logic, layout, attributes, and/or the like. For example, in some embodiments, WBS editor 930 allows site designer 908B to adapt a particular template and its elements according to his business or industry.

In some embodiments, site generation system 940 creates the actual site based on the integration and analysis of information entered by site designer 908B (e.g., via questionnaires), pre-specified and stored in content management system 1000 together with information from external systems 970 and internal information held within CMS 1000 that may be gleaned from use of the WBS 910 by other designers. Additionally or alternatively, CMS 1000 is held in centralized storage or locally by site designer 908B. Example repositories of a CMS 1000 are described below with respect to FIG. 10.

With reference to FIG. 10, an example CMS 1000 is illustrated. The WBS 910 may utilize a CMS 1000, comprising a series of repositories, stored over one or more servers or server farms, to support creation of various web sites. For example, CMS 1000 may include one or more of user information/profile repository 1012, WBS component repository 1016, WBS site repository 1009, business intelligence (BI) repository 1010, and editing history repository 1011. Additionally or alternatively, CMS 1000 may include one or more of questionnaire type repository 1001, content element type repository 1002, LE (layout element) type repository 1003, design kit repository 1004, filled questionnaires repository 1005, CER (content element repository) 1006, LER (layout element repository) 1007, layout selection store 1008, rules repository 1013, family/industry repository 1014, and ML/AI (machine learning/artificial intelligence) repository 1015. A CMS 1000 may also include a CMS coordinator 1017 to coordinate and control access to such one or more repositories.

It is contemplated by this disclosure that the WBS 910 may be used to create and/or update hierarchical websites based on visual editing or automatic generation based on collected business knowledge, where collected business knowledge refers to the collection of relevant content to the web site being created which may be gleaned from, for example, external systems 670 or other sources. Further details regarding collected business knowledge are described in commonly-owned U.S. Pat. No. 10,073,923 which was filed May 29, 2017 as U.S. patent application Ser. No. 15/607,586, and is entitled "SYSTEM AND METHOD FOR THE CREATION AND UPDATE OF HIERARCHICAL WEBSITES BASED ON COLLECTED BUSINESS KNOWLEDGE," which application is incorporated by reference herein in its entirety.

In some embodiments, WBS 910 uses internal data architecture to store WBS-based sites. For example, this architecture may organize the handled sites' internal data and elements inside the WBS 910. This architecture may be different from the external view of the site (as seen, for example, by the end-users) and may also be different from the way the corresponding HTML pages sent to the browser are organized. For example, in some embodiments, the internal data architecture contains additional properties for each element in the page (e.g., creator, creation time, access permissions, link to templates, SEO related information, and/or the like) which are relevant for the editing and maintenance of the site in the WBS 910, but are not externally visible to end-users (or even to some editing users). The internal version of the sites may be stored in a site repository as further detailed below.

In some embodiments, a WBS 910 is used with applications. For example, a visual application is a website including pages, containers, and components. Each page is separately displayed and includes one or more components. In some embodiments, components include containers as well as atomic components. In some embodiments, the WBS 910 supports hierarchical arrangements of components using atomic components (e.g., text, image, shape, video, and/or the like) as well as various types of container components which contain other components (e.g., regular containers, single-page containers, multi-page containers, gallery containers, and/or the like). The sub-pages contained inside a container component are referred to as mini-pages, each of which may contain multiple components. Some container components may display just one of the mini-pages at a time, while others may display multiple mini-pages simultaneously.

In some examples, pages may use templates—general page templates or component templates. In an exemplary embodiment, an application master page containing components replicated in all other regular pages is a template. In another exemplary embodiments, an application header/footer, which repeats on all pages, is a template. In some embodiments, templates may be used for the complete page or page sections. A WBS 910 may provide inheritance between templates, pages or components, possibly including multi-level inheritance, multiple inheritance and diamond inheritance (e.g., A inherits from B and C, and both B and C inherit from D). In some embodiments, a WBS 910 supports site templates.

In some embodiments, the visual arrangement of components inside a page is a layout. In some embodiments, a WBS 910 supports dynamic layout processing whereby the editing of a given component (or other changes affecting it such as externally-driven content change) may affect other components. Further details regarding dynamic layout processing are described in commonly-owned U.S. Pat. No. 10,185,703, which was filed Feb. 20, 2013 as U.S. patent application Ser. No. 13/771,119, and is entitled "WEB SITE DESIGN SYSTEM INTEGRATING DYNAMIC LAYOUT AND DYNAMIC CONTENT," which patent is incorporated by reference herein in its entirety.

In some embodiments, a WBS 910 is extended using add-on applications, such as third-party applications and components, list applications, and WBS configurable applications. In certain embodiments, such add-on applications may be added and integrated into designed web sites. Such add-on applications may be purchased (or otherwise acquired) through a number of distribution mechanisms, such as being pre-included in the WBS design environment, from an application store (e.g., integrated into the WBS object marketplace 915 or external) or directly from the third-party vendor. Such third-party applications may be hosted on the servers of the WBS vendor, the servers of the third-party application's vendor, and/or a 4th party server infrastructure.

In some embodiments, a WBS 910 allows procedural code to be added to some or all of the entities (e.g., applications, pages, elements, components, and the like). Such code could be written in a standard language (such as JavaScript), an extended version of a standard language or a language proprietary to the specific WBS 910. The executed code may reference APIs provided by the WBS 910 itself or external providers. The code may also reference internal constructs and objects of the WBS 910, such as pages, components and their attributes.

In some embodiments, the procedural code elements may be activated via event triggers which may be associated with user activities (e.g., mouse move or click, page transition and/or the like), activities associated with other users (e.g., an underlying database or a specific database record being updated by another user and/or the like), system events or other types of conditions. The activated code may be executed inside the WBS's client element (e.g., client devices 808), the server platform, a combination of the two or a dynamically determined execution platform. Further details regarding activation of customized back-end functionality are described in commonly-owned U.S. Pat. No. 10,209,966, which was filed on Jul. 24, 2018 as U.S. patent application Ser. No. 16/044,461, and is entitled "CUSTOM BACK-END FUNCTIONALITY IN AN ONLINE WEBSITE BUILDING ENVIRONMENT," which patent is incorporated by reference herein in its entirety.

FIG. 11 illustrates a block diagram of an example apparatus that may be specially configured in accordance with an example embodiment of the present disclosure. In some embodiments, TER integration system 810 and/or TER integration server 812 is embodied by one or more computing systems, such as the apparatus 1100 as depicted and described in FIG. 11.

FIG. 11 shows a schematic block diagram of example modules or circuitry, some or all of which may be included in server apparatus 1100. As illustrated in FIG. 11, in accordance with some example embodiments, the server apparatus 1100 may include various means, such as memory 1102, processor 1104, input/output module 1106, communications module 1108, and/or TER integration module 1110. The server apparatus 1100 may be configured, using one or more of the modules 1102-1110, to execute the operations regarding implementing TER integration functionality with respect to FIGS. 1-10. Said differently, systems, methods, apparatuses, and/or computer program products as described herein are configured to transform or otherwise manipulate a general purpose computer(s) so that it functions as a special purpose computer to provide TER integration as described herein.

Although the use of the terms "module" and "circuitry" as used herein with respect to components 1102-1110 are described in some cases using functional language, it should be understood that the particular implementations necessarily include the use of particular hardware configured to perform the functions associated with the respective module or circuitry as described herein. It should also be understood that certain of these components 1102-1110 may include similar or common hardware. For example, two or more modules may both leverage use of the same processor, network interface, storage medium, or the like to perform their associated functions, such that duplicate hardware is not required for each module. It will be understood in this regard that some of the components or modules described in connection with the TER integration server 812, for example, may be housed within this device, while other components or modules are housed within another of these devices, or by yet another device not expressly illustrated in FIG. 8. Said differently, in some embodiments, one or more external systems (such as a remote cloud computing and/or data storage system) may also be leveraged to provide at least some of the functionality discussed herein.

While the terms "module" and "circuitry" should be understood broadly to include hardware, in some embodiments, the terms "module" and "circuitry" also include software for configuring the hardware. That is, in some embodiments, each of the modules 1102-1110 may be embodied by hardware, software, or a combination thereof, for performing the operations described herein. In some embodiments, some of the modules 1102-1110 may be embodied entirely in hardware or entirely in software, while other modules are embodied by a combination of hardware and software. For example, in some embodiments, the terms "module" and "circuitry" may include processing circuitry, storage media, network interfaces, input/output devices, and the like. In some embodiments, other elements of the server apparatus 1100 may provide or supplement the functionality of a particular module or circuitry. For example, the processor 1104 may provide processing functionality, the memory 1102 may provide storage functionality, the communications module 1108 may provide network interface functionality, and the like.

In some embodiments, one or more of the modules 1102-1110 may share hardware, to eliminate duplicate hardware requirements. Additionally or alternatively, in some embodiments, one or more of the modules 1102-1110 may be combined, such that a single module includes means configured to perform the operations of two or more of the modules 1102-1110. Additionally or alternatively, one or more of the modules 1102-1110 may be embodied by two or more submodules.

In some embodiments, the processor 1104 (and/or co-processor or any other processing circuitry assisting or otherwise associated with the processor) may be in communication with the memory 1102 via a bus for passing information among components of, for example, TER integration server 812. The memory 1102 is non-transitory and may include, for example, one or more volatile and/or non-volatile memories, or some combination thereof. In other words, for example, the memory 1102 may be an electronic storage device (e.g., a non-transitory computer readable storage medium). The memory 1102 may be configured to store information, data, content, applications, instructions, or the like, for enabling server apparatus 1100 (e.g., TER integration server 812) to carry out various functions in accordance with example embodiments of the present disclosure.

Although illustrated in FIG. 11 as a single memory, memory 1102 may comprise a plurality of memory components. The plurality of memory components may be embodied on a single computing device or distributed across a plurality of computing devices. In various embodiments, memory 1102 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 1102 may be configured to store information, data, applications, instructions, or the like for enabling server apparatus 1100 to carry out various functions in accordance with example embodiments discussed herein. For example, in at least some embodiments, memory 1102 is configured to buffer data for processing by processor 1104. Additionally or alternatively, in at least some embodiments, memory 1102 is configured to store program instructions for execution by processor 1104. Memory 1102 may store information in the form of static and/or dynamic information. This stored information may be stored and/or used by the server apparatus 1100 (e.g., TER integration server 812) during the course of performing its functionalities.

Processor 1104 may be embodied in a number of different ways and may, for example, include one or more processing devices configured to perform independently. Additionally, or alternatively, processor 1104 may include one or more processors configured in tandem via a bus to enable independent execution of instructions, pipelining, and/or multithreading. Processor 1104 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 11 as a single processor, in some embodiments, processor 804 comprises a plurality of processors. The plurality of processors may be embodied on a single computing device or may be distributed across a plurality of such devices collectively configured to function as TER integration server 812. The plurality of processors may be in operative communication with each other and may be collectively configured to perform one or more functionalities of TER integration server 812 as described herein.

In an example embodiment, processor 1104 is configured to execute instructions stored in the memory 1102 or otherwise accessible to processor 1104. Alternatively, or additionally, the processor 1104 may be configured to execute hard-coded functionality. As such, whether configured by hardware or software methods, or by a combination thereof, the processor 1104 may represent an entity (e.g., physically embodied in circuitry) capable of performing operations according to an embodiment of the present disclosure while configured accordingly. Alternatively, as another example, when the processor 1104 is embodied as an executor of software instructions, the instructions may specifically configure processor 1104 to perform one or more algorithms and/or operations described herein when the instructions are executed. For example, these instructions, when executed by processor 1104, may cause the server apparatus 1100 (e.g., TER integration server 812) to perform one or more of the functionalities of system 800 as described herein.

In some embodiments, the server apparatus 1100 further includes input/output module 1106 that may, in turn, be in communication with processor 1104 to provide an audible, visual, mechanical, or other output and/or, in some embodiments, to receive an indication of an input from a user, a client device 808, or another source. In that sense, input/output module 1106 may include means for performing analog-to-digital and/or digital-to-analog data conversions. Input/output module 1106 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output module 1106 may comprise a user interface and may comprise a web user interface, a mobile application, a client device, a kiosk, or the like. The processor 1104 and/or user interface circuitry comprising the processor 1104 may be configured to control one or more functions of a display or one or more user interface elements through computer program instructions (e.g., software and/or firmware) stored on a memory accessible to the processor 1104 (e.g., memory 1102, and/or the like). In some embodiments, aspects of input/output module 1106 may be reduced as compared to embodiments where server apparatus 1100 may be implemented as an end-user machine or other type of device designed for complex user interactions. In some embodiments (like other components discussed herein), input/output module 1106 may even be eliminated from server apparatus 1100. Input/output module 1106 may be in communication with memory 1102, communications module 1108, and/or any other component(s), such as via a bus. Although more than one input/output module 1106 and/or other component may be included in server apparatus 1100, only one is shown in FIG. 11 to avoid overcomplicating the disclosure (e.g., like the other components discussed herein).

Communications module 1108, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with server apparatus 1100. In this regard, communications module 1108 may include, for example, a network interface for enabling communications with a wired or wireless communication network. For example, in some embodiments, communications module 1108 is configured to receive and/or transmit any data that may be stored by memory 1102 using any protocol that may be used for communications between computing devices. For example, communications module 1108 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, communications module 1108 includes circuitry for interacting with the antenna(s) to cause transmission of signals via the antenna(e) or to handle receipt of signals received via the antenna(e). These signals may be transmitted by TER integration server 812 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications module 1108 may additionally or alternatively be in communication with the memory 1102, input/output module 1106 and/or any other component of server apparatus 1100, such as via a bus.

In some embodiments, TER integration module 1110 is included in the server apparatus 1100 and configured to perform the functionality discussed herein related to TER integration. In some embodiments, TER integration module 1110 includes hardware, software, firmware, and/or a combination of such components, configured to support various aspects of such TER integration-related functionality, features, and/or services of the TER integration module 1110 as described herein.

It should be appreciated that, in some embodiments, TER integration module 1110 performs one or more of such exemplary actions in combination with another module of the server apparatus 1100, such as one or more of memory 1102, processor 1104, input/output module 1106, and communications module 1108. For example, in some embodiments, TER integration module 1110 utilizes processing circuitry, such as the processor 1104 and/or the like, to perform one or more of its corresponding operations. In a further example, some or all of the functionality of TER integration module 1110 may be performed by processor 1104 in some embodiments. In this regard, some or all of the example TER integration processes and algorithms discussed herein may be performed by at least one processor 1104 and/or TER integration module 1110. It should also be appreciated that, in some embodiments, TER integration module 1110 may include a separate processor, specially configured field programmable gate array (FPGA), or application specific integrated circuit (ASIC) to perform its corresponding functions.

Additionally or alternatively, in some embodiments, TER integration module 1110 utilizes memory 1102 to store collected information. For example, in some implementations, TER integration module 1110 includes hardware, software, firmware, and/or a combination thereof, that interacts with repository 814 (as illustrated in FIG. 8) and/or memory 1102 to send, retrieve, update, and/or store data values embodied by and/or associated with the TER integration module 1110.

FIG. 12 illustrates a block diagram of an example client apparatus that may be specially configured in accordance with an example embodiment of the present disclosure. In some embodiments, the client device 808A-B is embodied by one or more computing systems, such as the client apparatus 1200 as depicted and described in FIG. 12. The client apparatus 1200 includes a memory 1202, processor 1204, input/output module 1206, communications module 1208, and/or TER integration module 1210. The client apparatus 1200 may be configured using one or more of the sets of circuitry to execute the operations described herein. The modules 1202-1210 may function similarly or identically to the similarly-named modules depicted and described with respect to the server apparatus 1100. For purposes of brevity, repeated disclosure with regard to the functionality of such similarly-named sets of circuitry is omitted herein.

In some embodiments, TER integration module 1210 is included in the client apparatus 1200 (e.g., client device 808) and configured to perform the functionality discussed herein related to, inter alia, TER integration. In some embodiments, TER integration module 1210 includes hardware, software, firmware, and/or a combination of such components, configured to support various aspects of such TER integration-related functionality, features, and/or services of the TER integration module 1210.

In some embodiments, one or more of the modules 1202-1210 are combinable. Alternatively or additionally, in some embodiments, one or more of the modules perform some or all of the functionality described associated with another component. For example, in some embodiments, one or more of the modules 1202-1210 are combined into a single module embodied in hardware, software, firmware, and/or a combination thereof. Similarly, in some embodiments, one or more of the modules, for example TER integration module 1210 is combined with the processor 1204 such that the processor 1204 performs one or more of the operations described above with respect to each of these modules.

Thus, particular embodiments of the subject matter have been described. While this specification contains many specific implementation details, these should not be construed as limitations on the scope of any inventions or of what may be claimed, but rather as description of features specific to particular embodiments of particular inventions. Other embodiments are within the scope of the following claims. Certain features that are described herein in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Any operational step shown in broken lines in one or more flow diagrams illustrated herein are optional for purposes of the depicted embodiment.

In some cases, the actions recited in the claims may be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Accordingly, non-transitory computer readable storage media may be configured to store firmware, one or more application programs, and/or other software, which include instructions and/or other computer-readable program code portions that may be executed to control processors of the components of server apparatus 1100 and/or client apparatus 1200 to implement various operations, including the examples shown herein. As such, a series of computer-readable program code portions may be embodied in one or more computer program products and may be used, with a device, database, and/or other programmable apparatus, to produce the machine-implemented processes discussed herein. It is also noted that all or some of the information discussed herein may be based on data that is received, generated and/or maintained by one or more components of the TER integration server 812 and/or client device 808. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as systems, methods, apparatuses, computing devices, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions embodied in the computer-readable storage medium (e.g., computer software stored on a hardware device). Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein in connection with the components of TER integration server 812 and client device 808.

The computing systems described herein may include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with a client device or an admin user interacting with an admin device). Information/data generated at the client device may be received from the client device at the server.

The following exemplary embodiments are provided, the numbering of which is not to be construed as designating levels of importance or relevance.

Example 1. A website building system is configured to provide temporal external resource (TER) integration within websites generated using the website building system. The website building system comprises one or more website building repositories storing one or more website building components and one or more website editing historical interactions associated with a plurality of editing user identifiers. The website building system further comprises one or more processors configured to execute software instructions to perform operations for automatically generating electronic temporal external resource (TER) vector allocation recommendation interfaces. The operations comprise retrieving a website identifier associated with a website assembled based at least in part on the one or more website building repositories, wherein the website identifier is selected from a plurality of website identifiers, and wherein the website identifier is associated with an editing user identifier of the plurality of editing user identifiers. The operations further comprise retrieving end-user data from an end-user data corpus comprising electronic interaction data associated with a first end-user identifier of a plurality of end-user identifiers, wherein the end-user data associated with the first end-user identifier comprises one or more electronic interactions performed by a first client computing device associated with the first end-user identifier accessing one or more websites assembled based at least in part on the one or more website building repositories. The operations further comprise retrieving a multi-dimensional temporal external resource (TER) matrix maintained by the website building system and associated with the website identifier, wherein the multi-dimensional TER matrix comprises a plurality of TER vectors. The operations further comprise, based at least in part on applying one or more trained machine learning models or one or more rule-based models to historical editing interactions associated with the editing user identifier and the end-user data, selecting a TER vector. The operations further comprise generating an electronic TER recommendation interface according to the TER vector, and transmitting the electronic TER recommendation interface to a client computing device associated with the first end-user identifier or the editing user identifier.

Example 2. A system according to Example 1, wherein the one or more trained machine learning models are trained using historical editing interactions associated with a plurality of editing user identifiers assembling websites based at least in part on the one or more website building repositories and end-user data associated with the plurality of end-user identifiers comprising one or more electronic interactions performed by a plurality of client computing devices associated with the plurality of end-user identifiers accessing one or more websites assembled based at least in part on the one or more website building repositories.

Example 3. A system according to Examples 1 or 2, wherein the one or more trained machine learning models are configured to select the TER vector, based at least in part on the historical editing interactions associated with the editing user identifier and the end-user data, wherein the TER vector is selected in accordance with a first programmatically generated likelihood that a TER allocation operation will be executed in accordance with the TER vector for the first end-user identifier and the website identifier and a second programmatically generated likelihood that the TER allocation operation will be associated with a positive engagement indicator.

Example 4. A system according to any of the foregoing examples, wherein the one or more rule-based models are configured to select the TER vector, based at least in part on the historical editing interactions associated with the editing user identifier and the end-user data, wherein the TER vector is identified in accordance with learned rules.

Example 5. A system according to any of the foregoing examples, wherein the TER vector is further selected based at least in part on maximizing TER vector allocations for the multi-dimensional TER matrix.

Example 6. A system according to any of the foregoing examples, wherein the TER vector is further selected based at least in part on one of an expected currency value associated with a TER vector allocation for the TER vector and the first end-user identifier or whether the TER vector is associated with an in-progress event.

Example 7. A system according to any of the foregoing examples, wherein the one or more website building tools comprise one or more of pages, sub-pages, containers, components, atomic components, content elements, layout elements, templates, or layout rules.

Example 8. A system according to any of the foregoing examples, wherein the TER vector comprises a plurality of TER vector records.

Example 9. A system according to any of the foregoing examples, wherein a TER vector record of the plurality of TER vector records comprises one or more of an event identifier, an event type identifier, a TER start time, a TER end time, or a TER location.

Example 10. A system according to any of the foregoing examples, wherein the one or more electronic interactions comprise one or more TER vector allocations associated with the first end-user identifier and the website identifier.

Example 11. A system according to any of the foregoing examples, wherein the one or more TER vector allocations are associated with an engagement indicator.

Example 12. A system according to any of the foregoing examples, wherein the engagement indicator is one of positive, negative, or partial.

Example 13. A system according to any of the foregoing examples, wherein the first end-user identifier is associated with a plurality of TER vector allocations associated with the website identifier, wherein every TER vector allocation of the plurality of TER vector allocations is associated with a positive engagement indicator.

Example 14. A system according to any of the foregoing examples, wherein end-user data further comprises electronic interaction data received from a remote computing device associated with the website identifier.

Example 15. A system according to any of the foregoing examples, wherein the remote computing device is one of a point-of-sale terminal, or a sensor device.

Example 16. A system according to any of the foregoing examples, wherein the website identifier is associated with a transaction category type.

Example 17. A system according to any of the foregoing examples, wherein the transaction category type is one of electronic or non-electronic.

Example 18. A system according to any of the foregoing examples, wherein the electronic TER recommendation interface comprises one or more selectable interface elements.

Example 19. A system according to any of the foregoing examples, wherein the operations further comprise automatically executing a TER vector allocation operation in accordance with the TER vector.

Example 20. A system according to any of the foregoing examples, wherein the operations further comprise, based at least in part on executing the TER vector allocation operation, transforming an availability record associated with the TER vector to reflect the TER vector allocation operation and synchronizing the multi-dimensional TER matrix with a second multi-dimensional TER matrix.

Example 21. A system according to any of the foregoing examples, wherein the operations further comprise configuring the second multi-dimensional TER matrix for display via the website.

Example 22. A non-transitory computer readable storage medium storing instructions that, when executed by at least one processor of an apparatus, cause the apparatus to perform operations for automatically generating electronic temporal external resource (TER) vector allocation recommendation interfaces within a website building system. The operations comprise retrieving a website identifier associated with a website assembled based at least in part on one or more website building repositories, wherein the one or more website building repositories store one or more website building components and one or more website editing historical interactions associated with a plurality of editing user identifiers, wherein the website identifier is selected from a plurality of website identifiers, and wherein the website identifier is associated with an editing user identifier of the plurality of editing user identifiers. The operations further comprise retrieving end-user data from an end-user data corpus comprising electronic interaction data associated with a first end-user identifier of a plurality of end-user identifiers, wherein the end-user data associated with the first end-user identifier comprises one or more electronic interactions performed by a first client computing device associated with the first end-user identifier accessing one or more websites assembled based at least in part on the one or more website building repositories. The operations further comprise retrieving a multi-dimensional temporal external resource (TER) matrix maintained by the website building system and associated with the website identifier, wherein the multi-dimensional TER matrix comprises a plurality of TER vectors. The operations further comprise, based at least in part on applying one or more trained machine learning models or one or more rule-based models to historical editing interactions associated with the editing user identifier and the end-user data, selecting a TER vector. The operations further comprise generating an electronic TER recommendation interface according to the TER vector, and transmitting the electronic TER recommendation interface to a client computing device associated with the first end-user identifier or the editing user identifier.

Example 23. A storage medium according to Example 22, wherein the one or more trained machine learning models are trained using historical editing interactions associated with a plurality of editing user identifiers assembling websites based at least in part on the one or more website building repositories and end-user data associated with the plurality of end-user identifiers comprising one or more electronic interactions performed by a plurality of client computing devices associated with the plurality of end-user identifiers accessing one or more websites assembled based at least in part on the one or more website building repositories.

Example 24. A storage medium according to any of the foregoing examples, wherein the one or more trained machine learning models are configured to select the TER vector, based at least in part on the historical editing interactions associated with the editing user identifier and the end-user data, wherein the TER vector is selected in accordance with a first programmatically generated likelihood that a TER allocation operation will be executed in accordance with the TER vector for the first end-user identifier and the website identifier and a second programmatically generated likelihood that the TER allocation operation will be associated with a positive engagement indicator.

Example 25. A storage medium according to any of the foregoing examples, wherein the one or more rule-based models are configured to select the TER vector, based at least in part on the historical editing interactions associated with the editing user identifier and the end-user data, wherein the TER vector is identified in accordance with learned rules.

Example 26. A storage medium according to any of the foregoing examples, wherein the TER vector is further selected based at least in part on maximizing TER vector allocations for the multi-dimensional TER matrix.

Example 27. A storage medium according to any of the foregoing examples, wherein the TER vector is further selected based at least in part on one of an expected currency value associated with a TER vector allocation for the TER vector and the first end-user identifier or whether the TER vector is associated with an in-progress event.

Example 28. A storage medium according to any of the foregoing examples, wherein the one or more website building tools comprise one or more of pages, sub-pages, containers, components, atomic components, content elements, layout elements, templates, or layout rules.

Example 29. A storage medium according to any of the foregoing examples, wherein the TER vector comprises a plurality of TER vector records.

Example 30. A storage medium according to any of the foregoing examples, wherein a TER vector record of the plurality of TER vector records comprises one or more of an event identifier, an event type identifier, a TER start time, a TER end time, or a TER location.

Example 31. A storage medium according to any of the foregoing examples, wherein the one or more electronic interactions comprise one or more TER vector allocations associated with the first end-user identifier and the website identifier.

Example 32. A storage medium according to any of the foregoing examples, wherein the one or more TER vector allocations are associated with an engagement indicator.

Example 33. A storage medium according to any of the foregoing examples, wherein the engagement indicator is one of positive, negative, or partial.

Example 34. A storage medium according to any of the foregoing examples, wherein the first end-user identifier is associated with a plurality of TER vector allocations associated with the website identifier, wherein every TER vector allocation of the plurality of TER vector allocations is associated with a positive engagement indicator.

Example 35. A storage medium according to any of the foregoing examples, wherein end-user data further comprises electronic interaction data received from a remote computing device associated with the website identifier.

Example 36. A storage medium according to any of the foregoing examples, wherein the remote computing device is one of a point-of-sale terminal, or a sensor device.

Example 37. A storage medium according to any of the foregoing examples, wherein the website identifier is associated with a transaction category type.

Example 38. A storage medium according to any of the foregoing examples, wherein the transaction category type is one of electronic or non-electronic.

Example 39. A storage medium according to any of the foregoing examples, wherein the electronic TER recommendation interface comprises one or more selectable interface elements.

Example 40. A storage medium according to any of the foregoing examples, wherein the operations further comprise automatically executing a TER vector allocation operation in accordance with the TER vector.

Example 41. A storage medium according to any of the foregoing examples, wherein the operations further comprise, based at least in part on executing the TER vector allocation operation, transforming an availability record associated with the TER vector to reflect the TER vector allocation operation and synchronizing the multi-dimensional TER matrix with a second multi-dimensional TER matrix.

Example 42. A storage medium according to any of the foregoing examples, wherein the operations further comprise configuring the second multi-dimensional TER matrix for display via the website.

Example 43. A computer-implemented method for automatically generating electronic temporal external resource (TER) vector allocation recommendation interfaces within a website building system. The method comprises retrieving a website identifier associated with a website assembled based at least in part on one or more website building repositories, wherein the one or more website building repositories store one or more website building components and one or more website editing historical interactions associated with a plurality of editing user identifiers, wherein the website identifier is selected from a plurality of website identifiers, and wherein the website identifier is associated with an editing user identifier of the plurality of editing user identifiers. The method further comprises retrieving end-user data from an end-user data corpus comprising electronic interaction data associated with a first end-user identifier of a plurality of end-user identifiers, wherein the end-user data associated with the first end-user identifier comprises one or more electronic interactions performed by a first client computing device associated with the first end-user identifier accessing one or more websites assembled based at least in part on the one or more website building repositories. The method further comprises retrieving a multi-dimensional temporal external resource (TER) matrix maintained by the website building system and associated with the website identifier, wherein the multi-dimensional TER matrix comprises a plurality of TER vectors. The method further comprises, based at least in part on applying one or more trained machine learning models or one or more rule-based models to historical editing interactions associated with the editing user identifier and the end-user data, selecting a TER vector. The method further comprises generating an electronic TER recommendation interface according to the TER vector, and transmitting the electronic TER recommendation interface to a client computing device associated with the first end-user identifier or the editing user identifier.

Example 44. A method according to Example 43, wherein the one or more trained machine learning models are trained using historical editing interactions associated with a plurality of editing user identifiers assembling websites based at least in part on the one or more website building repositories and end-user data associated with the plurality of end-user identifiers comprising one or more electronic interactions performed by a plurality of client computing devices associated with the plurality of end-user identifiers accessing one or more websites assembled based at least in part on the one or more website building repositories.

Example 45. A method according to any of the foregoing examples, wherein the one or more trained machine learning models are configured to select the TER vector, based at least in part on the historical editing interactions associated with the editing user identifier and the end-user data, wherein the TER vector is selected in accordance with a first programmatically generated likelihood that a TER allocation operation will be executed in accordance with the TER vector for the first end-user identifier and the website identifier and a second programmatically generated likelihood that the TER allocation operation will be associated with a positive engagement indicator.

Example 46. A method according to any of the foregoing examples, wherein the one or more rule-based models are configured to select the TER vector, based at least in part on the historical editing interactions associated with the editing user identifier and the end-user data, wherein the TER vector is identified in accordance with learned rules.

Example 47. A method according to any of the foregoing examples, wherein the TER vector is further selected based at least in part on maximizing TER vector allocations for the multi-dimensional TER matrix.

Example 48. A method according to any of the foregoing examples, wherein the TER vector is further selected based at least in part on one of an expected currency value associated with a TER vector allocation for the TER vector and the first end-user identifier or whether the TER vector is associated with an in-progress event.

Example 49. A method according to any of the foregoing examples, wherein the one or more website building tools comprise one or more of pages, sub-pages, containers, components, atomic components, content elements, layout elements, templates, or layout rules.

Example 50. A method according to any of the foregoing examples, wherein the TER vector comprises a plurality of TER vector records.

Example 51. A method according to any of the foregoing examples, wherein a TER vector record of the plurality of TER vector records comprises one or more of an event identifier, an event type identifier, a TER start time, a TER end time, or a TER location.

Example 52. A method according to any of the foregoing examples, wherein the one or more electronic interactions comprise one or more TER vector allocations associated with the first end-user identifier and the website identifier.

Example 53. A method according to any of the foregoing examples, wherein the one or more TER vector allocations are associated with an engagement indicator.

Example 54. A method according to any of the foregoing examples, wherein the engagement indicator is one of positive, negative, or partial.

Example 55. A method according to any of the foregoing examples, wherein the first end-user identifier is associated with a plurality of TER vector allocations associated with the website identifier, wherein every TER vector allocation of the plurality of TER vector allocations is associated with a positive engagement indicator.

Example 56. A method according to any of the foregoing examples, wherein end-user data further comprises electronic interaction data received from a remote computing device associated with the website identifier.

Example 57. A method according to any of the foregoing examples, wherein the remote computing device is one of a point-of-sale terminal, or a sensor device.

Example 58. A method according to any of the foregoing examples, wherein the website identifier is associated with a transaction category type.

Example 59. A method according to any of the foregoing examples, wherein the transaction category type is one of electronic or non-electronic.

Example 60. A method according to any of the foregoing examples, wherein the electronic TER recommendation interface comprises one or more selectable interface elements.

Example 61. A method according to any of the foregoing examples, further comprising automatically executing a TER vector allocation operation in accordance with the TER vector.

Example 62. A method according to any of the foregoing examples, further comprising, based at least in part on executing the TER vector allocation operation, transforming an availability record associated with the TER vector to reflect the TER vector allocation operation and synchronizing the multi-dimensional TER matrix with a second multi-dimensional TER matrix.

Example 63. A method according to any of the foregoing examples, further comprising configuring the second multi-dimensional TER matrix for display via the website.

Example 64. A website building system configured to automatically generate recommended engagement transmissions. The website building system comprises one or more website building repositories storing one or more website building components and one or more website editing historical interactions associated with a plurality of editing user identifiers, and one or more processors configured to execute software instructions to perform operations for automatically generating recommended engagement transmissions. The operations comprise retrieving a website identifier associated with a website assembled based at least in part on the one or more website building repositories, wherein the website identifier is selected from a plurality of website identifiers, and wherein the website identifier is associated with an editing user identifier of the plurality of editing user identifiers. The operations further comprise retrieving end-user data from an end-user data corpus comprising electronic interaction data associated with a plurality of end-user identifiers, wherein the end-user data comprises one or more electronic interactions performed by a plurality of client computing devices associated with the plurality of end-user identifiers accessing one or more websites assembled based at least in part on the one or more website building repositories. The operations further comprise selecting, based at least in part on applying one or more trained machine learning models or rule-based models to the end-user data and website editing historical interactions associated with the website identifier, a first end-user identifier among the plurality of end-user identifiers as an engagement transmission candidate in accordance with an engagement score. The operations further comprise generating an engagement transmission based at least in part on the first-end user identifier and the website identifier, and transmitting the engagement transmission to a client computing device associated with the first end-user identifier.

Example 65. A system according to Example 64, wherein the one or more trained machine learning models are trained using historical editing interactions associated with the plurality of editing user identifiers assembling websites based at least in part on the one or more website building repositories and end-user data associated with the plurality of end-user identifiers comprising one or more electronic interactions performed by the plurality of client computing devices associated with the plurality of end-user identifiers accessing one or more websites assembled based at least in part on the one or more website building repositories.

Example 66. A system according to any of the foregoing examples, wherein the end-user data is further associated with a plurality of TER vector allocations, wherein every TER vector allocation of the plurality of TER vector allocations is associated with an engagement indicator.

Example 67. A system according to any of the foregoing examples, wherein the engagement indicator is positive or negative.

Example 68. A system according to any of the foregoing examples, wherein selecting the first end-user identifier is based at least in part on a count of positive engagement indicators.

Example 69. A system according to any of the foregoing examples, wherein the one or more trained machine learning models are configured to generate the engagement score for the first end-user identifier, based at least in part on the historical editing interactions associated with the editing user identifier and the end-user data, wherein the engagement score represents a programmatically generated likelihood that the client computing device associated with the first end-user identifier will engage with the website after having received the engagement transmission.

Example 70. A system according to any of the foregoing examples, wherein selecting the first end-user identifier is based at least in part on the engagement score exceeding an engagement score threshold.

Example 71. A system according to any of the foregoing examples, wherein the one or more rule-based models are configured to select the first end-user identifier, based at least in part on the historical editing interactions associated with the editing user identifier and the end-user data, wherein the first end-user identifier is identified in accordance with learned rules.

Example 72. A system according to any of the foregoing examples, wherein end-user data further comprises electronic interaction data received from a remote computing device associated with the website identifier.

Example 73. A system according to any of the foregoing examples, wherein the remote computing device is one of a point-of-sale terminal, or a sensor device.

Example 74. A system according to any of the foregoing examples, wherein the engagement transmission comprises an electronic communication.

Example 75. A system according to any of the foregoing examples, wherein the engagement transmission comprises an electronic incentive communication.

Example 76. A system according to any of the foregoing examples, wherein the engagement transmission comprises an event type change.

Example 77. A system according to any of the foregoing examples, wherein the engagement transmission comprises an event time change.

Example 78. A system according to any of the foregoing examples, wherein the operations further comprise automatically executing a TER vector allocation operation based at least in part on the engagement transmission.

Example 79. A system according to any of the foregoing examples, wherein the one or more website building tools comprise one or more of pages, sub-pages, containers, components, atomic components, content elements, layout elements, templates, or layout rules.

Example 80. A non-transitory computer readable storage medium storing instructions that, when executed by at least one processor of an apparatus, cause the apparatus to perform operations for automatically generating recommended engagement transmissions. The operations comprise retrieving a website identifier associated with a website assembled based at least in part on one or more website building repositories, wherein the one or more website building repositories store one or more website building components and one or more website editing historical interactions associated with a plurality of editing user identifiers, wherein the website identifier is selected from a plurality of website identifiers, and wherein the website identifier is associated with an editing user identifier of the plurality of editing user identifiers. The operations further comprise retrieving end-user data from an end-user data corpus comprising electronic interaction data associated with a plurality of end-user identifiers, wherein the end-user data comprises one or more electronic interactions performed by a plurality of client computing devices associated with the plurality of end-user identifiers accessing one or more websites assembled based at least in part on the one or more website building repositories. The operations further comprise selecting, based at least in part on applying one or more trained machine learning models or rule-based models to the end-user data and website editing historical interactions associated with the website identifier, a first end-user identifier among the plurality of end-user identifiers as an engagement transmission candidate in accordance with an engagement score. The operations further comprise generating an engagement transmission based at least in part on the first-end user identifier and the website identifier, and transmitting the engagement transmission to a client computing device associated with the first end-user identifier.

Example 81. A storage medium according to Example 80, wherein the one or more trained machine learning models are trained using historical editing interactions associated with the plurality of editing user identifiers assembling websites based at least in part on the one or more website building repositories and end-user data associated with the plurality of end-user identifiers comprising one or more electronic interactions performed by the plurality of client computing devices associated with the plurality of end-user identifiers accessing one or more websites assembled based at least in part on the one or more website building repositories.

Example 82. A storage medium according to any of the foregoing examples, wherein the end-user data is further associated with a plurality of TER vector allocations, wherein every TER vector allocation of the plurality of TER vector allocations is associated with an engagement indicator.

Example 83. A storage medium according to any of the foregoing examples, wherein the engagement indicator is positive or negative.

Example 84. A storage medium according to any of the foregoing examples, wherein selecting the first end-user identifier is based at least in part on a count of positive engagement indicators.

Example 85. A storage medium according to any of the foregoing examples, wherein the one or more trained machine learning models are configured to generate the engagement score for the first end-user identifier, based at least in part on the historical editing interactions associated with the editing user identifier and the end-user data, wherein the engagement score represents a programmatically generated likelihood that the client computing device associated with the first end-user identifier will engage with the website after having received the engagement transmission.

Example 86. A storage medium according to any of the foregoing examples, wherein selecting the first end-user identifier is based at least in part on the engagement score exceeding an engagement score threshold.

Example 87. A storage medium according to any of the foregoing examples, wherein the one or more rule-based models are configured to select the first end-user identifier, based at least in part on the historical editing interactions associated with the editing user identifier and the end-user data, wherein the first end-user identifier is identified in accordance with learned rules.

Example 88. A storage medium according to any of the foregoing examples, wherein end-user data further comprises electronic interaction data received from a remote computing device associated with the website identifier.

Example 89. A storage medium according to any of the foregoing examples, wherein the remote computing device is one of a point-of-sale terminal, or a sensor device.

Example 90. A storage medium according to any of the foregoing examples, wherein the engagement transmission comprises an electronic communication.

Example 91. A storage medium according to any of the foregoing examples, wherein the engagement transmission comprises an electronic incentive communication.

Example 92. A storage medium according to any of the foregoing examples, wherein the engagement transmission comprises an event type change.

Example 93. A storage medium according to any of the foregoing examples, wherein the engagement transmission comprises an event time change.

Example 94. A storage medium according to any of the foregoing examples, wherein the operations further comprise automatically executing a TER vector allocation operation based at least in part on the engagement transmission.

Example 95. A storage medium according to any of the foregoing examples, wherein the one or more website building tools comprise one or more of pages, sub-pages, containers, components, atomic components, content elements, layout elements, templates, or layout rules.

Example 96. A computer-implemented method for automatically generating recommended engagement transmissions. The method comprises retrieving a website identifier associated with a website assembled based at least in part on one or more website building repositories, wherein the one or more website building repositories store one or more website building components and one or more website editing historical interactions associated with a plurality of editing user identifiers, wherein the website identifier is selected from a plurality of website identifiers, and wherein the website identifier is associated with an editing user identifier of the plurality of editing user identifiers. The method further comprises retrieving end-user data from an end-user data corpus comprising electronic interaction data associated with a plurality of end-user identifiers, wherein the end-user data comprises one or more electronic interactions performed by a plurality of client computing devices associated with the plurality of end-user identifiers accessing one or more websites assembled based at least in part on the one or more website building repositories. The method further comprises selecting, based at least in part on applying one or more trained machine learning models or rule-based models to the end-user data and website editing historical interactions associated with the website identifier, a first end-user identifier among the plurality of end-user identifiers as an engagement transmission candidate in accordance with an engagement score. The method further comprises generating an engagement transmission based at least in part on the first-end user identifier and the website identifier, and transmitting the engagement transmission to a client computing device associated with the first end-user identifier.

Example 97. A method according to Example 96, wherein the one or more trained machine learning models are trained using historical editing interactions associated with the plurality of editing user identifiers assembling websites based at least in part on the one or more website building repositories and end-user data associated with the plurality of end-user identifiers comprising one or more electronic interactions performed by the plurality of client computing devices associated with the plurality of end-user identifiers accessing one or more websites assembled based at least in part on the one or more website building repositories.

Example 98. A method according to any of the foregoing examples, wherein the end-user data is further associated with a plurality of TER vector allocations, wherein every TER vector allocation of the plurality of TER vector allocations is associated with an engagement indicator.

Example 99. A method according to any of the foregoing examples, wherein the engagement indicator is positive or negative.

Example 100. A method according to any of the foregoing examples, wherein selecting the first end-user identifier is based at least in part on a count of positive engagement indicators.

Example 101. A method according to any of the foregoing examples, wherein the one or more trained machine learning models are configured to generate the engagement score for the first end-user identifier, based at least in part on the historical editing interactions associated with the editing user identifier and the end-user data, wherein the engagement score represents a programmatically generated likelihood that the client computing device associated with the first end-user identifier will engage with the website after having received the engagement transmission.

Example 102. A method according to any of the foregoing examples, wherein selecting the first end-user identifier is based at least in part on the engagement score exceeding an engagement score threshold.

Example 103. A method according to any of the foregoing examples, wherein the one or more rule-based models are configured to select the first end-user identifier, based at least in part on the historical editing interactions associated with the editing user identifier and the end-user data, wherein the first end-user identifier is identified in accordance with learned rules.

Example 104. A method according to any of the foregoing examples, wherein end-user data further comprises electronic interaction data received from a remote computing device associated with the website identifier.

Example 105. A method according to any of the foregoing examples, wherein the remote computing device is one of a point-of-sale terminal, or a sensor device.

Example 106. A method according to any of the foregoing examples, wherein the engagement transmission comprises an electronic communication.

Example 107. A method according to any of the foregoing examples, wherein the engagement transmission comprises an electronic incentive communication.

Example 108. A method according to any of the foregoing examples, wherein the engagement transmission comprises an event type change.

Example 109. A method according to any of the foregoing examples, wherein the engagement transmission comprises an event time change.

Example 110. A method according to any of the foregoing examples, further comprising automatically executing a TER vector allocation operation based at least in part on the engagement transmission.

Example 111. A method according to any of the foregoing examples, wherein the one or more website building tools comprise one or more of pages, sub-pages, containers, components, atomic components, content elements, layout elements, templates, or layout rules.

Example 112. A website building system configured to automatically execute interface population operations. The website building system comprises one or more website building repositories storing one or more website building components and one or more website editing historical interactions associated with a plurality of editing user identifiers, and one or more processors configured to execute software instructions to perform operations for automatically executing interface population operations. The operations comprise retrieving a website identifier associated with a website assembled based at least in part on the one or more website building repositories, wherein the website identifier is selected from a plurality of website identifiers, and wherein the website identifier is associated with an editing user identifier of the plurality of editing user identifiers. The operations further comprise retrieving a website vector associated with the website identifier, the website vector comprising a plurality of website records and a resource matrix. The operations further comprise retrieving end-user data from an end-user data corpus comprising electronic interaction data associated with a plurality of end-user identifiers, wherein the end-user data comprises one or more electronic interactions performed by a plurality of client computing devices associated with the plurality of end-user identifiers accessing one or more websites assembled based at least in part on the one or more website building repositories. The operations further comprise, based at least in part on applying one or more trained machine learning models or rule-based models to the end-user data, website editing historical interactions associated with the website identifier, and the website vector, automatically executing an interface populating operation in accordance with website records of the website vector.

Example 113. A system according to Example 112, wherein the one or more trained machine learning models are trained using historical editing interactions associated with the plurality of editing user identifiers assembling websites based at least in part on the one or more website building repositories and end-user data associated with the plurality of end-user identifiers comprising one or more electronic interactions performed by the plurality of client computing devices associated with the plurality of end-user identifiers accessing one or more websites assembled based at least in part on the one or more website building repositories.

Example 114. A system according to any of the foregoing examples, wherein the one or more trained machine learning models are configured to identify the interface populating operation, based at least in part on the historical editing interactions associated with the editing user identifier, the end-user data, and the website vector.

Example 115. A system according to any of the foregoing examples, wherein the one or more rule-based models are configured to identify the interface populating operation, based at least in part on the historical editing interactions associated with the editing user identifier, the end-user data, and the website vector, in accordance with learned rules.

Example 116. A system according to any of the foregoing examples, wherein end-user data further comprises electronic interaction data received from a remote computing device associated with the website identifier.

Example 117. A system according to any of the foregoing examples, wherein the remote computing device is one of a point-of-sale terminal, or a sensor device.

Example 118. A system according to any of the foregoing examples, wherein the operations further comprise presenting an output of the interface populating operation for inclusion in the website.

Example 119. A system according to any of the foregoing examples, wherein the interface populating operation comprises generating a new template.

Example 120. A system according to any of the foregoing examples, wherein the interface populating operation comprises updating an existing template.

Example 121. A system according to any of the foregoing examples, wherein the interface populating operation comprises pre-populating one or more interface elements of a temporal external resource (TER) vector allocations template for the website identifier.

Example 122. A system according to any of the foregoing examples, wherein an interface element comprises one or more of an image, a currency element, or a TER allocation element.

Example 123. A system according to any of the foregoing examples, wherein the TER allocation element comprises a selectable icon for completing a TER allocation operation in accordance with a TER vector.

Example 124. A system according to any of the foregoing examples, wherein the TER allocation element comprises a menu icon for completing a TER allocation operation in accordance with a TER vector.

Example 125. A system according to any of the foregoing examples, wherein the resource matrix comprises a plurality of TER vectors.

Example 126. A system according to any of the foregoing examples, wherein the operations further comprise including the output in the website upon receiving electronic approval from a client computing device.

Example 127. A system according to any of the foregoing examples, wherein the one or more website building tools comprise one or more of pages, sub-pages, containers, components, atomic components, content elements, layout elements, templates, or layout rules.

Example 128. A non-transitory computer readable storage medium comprises instructions that, when executed by at least one processor of an apparatus, cause the apparatus to perform operations for automatically executing interface population operations. The operations comprise retrieving a website identifier associated with a website assembled based at least in part on one or more website building repositories, wherein the one or more website building repositories store one or more website building components and one or more website editing historical interactions associated with a plurality of editing user identifiers, wherein the website identifier is selected from a plurality of website identifiers, and wherein the website identifier is associated with an editing user identifier of the plurality of editing user identifiers. The operations further comprise retrieving a website vector associated with the website identifier, the website vector comprising a plurality of website records and a resource matrix. The operations further comprise retrieving end-user data from an end-user data corpus comprising electronic interaction data associated with a plurality of end-user identifiers, wherein the end-user data comprises one or more electronic interactions performed by a plurality of client computing devices associated with the plurality of end-user identifiers accessing one or more websites assembled based at least in part on the one or more website building repositories. The operations further comprise, based at least in part on applying one or more trained machine learning models or rule-based models to the end-user data, website editing historical interactions associated with the website identifier, and the website vector, automatically executing an interface populating operation in accordance with website records of the website vector.

Example 129. A storage medium according to Example 128, wherein the one or more trained machine learning models are trained using historical editing interactions associated with the plurality of editing user identifiers assembling websites based at least in part on the one or more website building repositories and end-user data associated with the plurality of end-user identifiers comprising one or more electronic interactions performed by the plurality of client computing devices associated with the plurality of end-user identifiers accessing one or more websites assembled based at least in part on the one or more website building repositories.

Example 130. A storage medium according to any of the foregoing examples, wherein the one or more trained machine learning models are configured to identify the interface populating operation, based at least in part on the historical editing interactions associated with the editing user identifier, the end-user data, and the website vector.

Example 131. A storage medium according to any of the foregoing examples, wherein the one or more rule-based models are configured to identify the interface populating operation, based at least in part on the historical editing interactions associated with the editing user identifier, the end-user data, and the website vector, in accordance with learned rules.

Example 132. A storage medium according to any of the foregoing examples, wherein end-user data further comprises electronic interaction data received from a remote computing device associated with the website identifier.

Example 133. A storage medium according to any of the foregoing examples, wherein the remote computing device is one of a point-of-sale terminal, or a sensor device.

Example 134. A storage medium according to any of the foregoing examples, wherein the operations further comprise presenting an output of the interface populating operation for inclusion in the website.

Example 135. A storage medium according to any of the foregoing examples, wherein the interface populating operation comprises generating a new template.

Example 136. A storage medium according to any of the foregoing examples, wherein the interface populating operation comprises updating an existing template.

Example 137. A storage medium according to any of the foregoing examples, wherein the interface populating operation comprises pre-populating one or more interface elements of a temporal external resource (TER) vector allocations template for the website identifier.

Example 138. A storage medium according to any of the foregoing examples, wherein an interface element comprises one or more of an image, a currency element, or a TER allocation element.

Example 139. A storage medium according to any of the foregoing examples, wherein the TER allocation element comprises a selectable icon for completing a TER allocation operation in accordance with a TER vector.

Example 140. A storage medium according to any of the foregoing examples, wherein the TER allocation element comprises a menu icon for completing a TER allocation operation in accordance with a TER vector.

Example 141. A storage medium according to any of the foregoing examples, wherein the resource matrix comprises a plurality of TER vectors.

Example 142. A storage medium according to any of the foregoing examples, wherein the operations further comprise including the output in the website upon receiving electronic approval from a client computing device.

Example 143. A storage medium according to any of the foregoing examples, wherein the one or more website building tools comprise one or more of pages, sub-pages, containers, components, atomic components, content elements, layout elements, templates, or layout rules.

Example 144. A computer-implemented method for automatically executing interface population operations. The method comprises retrieving a website identifier associated with a website assembled based at least in part on one or more website building repositories, wherein the one or more website building repositories store one or more website building components and one or more website editing historical interactions associated with a plurality of editing user identifiers, wherein the website identifier is selected from a plurality of website identifiers, and wherein the website identifier is associated with an editing user identifier of the plurality of editing user identifiers. The method further comprises retrieving a website vector associated with the website identifier, the website vector comprising a plurality of website records and a resource matrix. The method further comprises retrieving end-user data from an end-user data corpus comprising electronic interaction data associated with a plurality of end-user identifiers, wherein the end-user data comprises one or more electronic interactions performed by a plurality of client computing devices associated with the plurality of end-user identifiers accessing one or more websites assembled based at least in part on the one or more website building repositories. The method further comprises, based at least in part on applying one or more trained machine learning models or rule-based models to the end-user data, website editing historical interactions associated with the website identifier, and the website vector, automatically executing an interface populating operation in accordance with website records of the website vector.

Example 145. A method according to Example 144, wherein the one or more trained machine learning models are trained using historical editing interactions associated with the plurality of editing user identifiers assembling websites based at least in part on the one or more website building repositories and end-user data associated with the plurality of end-user identifiers comprising one or more electronic interactions performed by the plurality of client computing devices associated with the plurality of end-user identifiers accessing one or more websites assembled based at least in part on the one or more website building repositories.

Example 146. A method according to any of the foregoing examples, wherein the one or more trained machine learning models are configured to identify the interface populating operation, based at least in part on the historical editing interactions associated with the editing user identifier, the end-user data, and the website vector.

Example 147. A method according to any of the foregoing examples, wherein the one or more rule-based models are configured to identify the interface populating operation, based at least in part on the historical editing interactions associated with the editing user identifier, the end-user data, and the website vector, in accordance with learned rules.

Example 148. A method according to any of the foregoing examples, wherein end-user data further comprises electronic interaction data received from a remote computing device associated with the website identifier.

Example 149. A method according to any of the foregoing examples, wherein the remote computing device is one of a point-of-sale terminal, or a sensor device.

Example 150. A method according to any of the foregoing examples, wherein the operations further comprise presenting an output of the interface populating operation for inclusion in the website.

Example 151. A method according to any of the foregoing examples, wherein the interface populating operation comprises generating a new template.

Example 152. A method according to any of the foregoing examples, wherein the interface populating operation comprises updating an existing template.

Example 153. A method according to any of the foregoing examples, wherein the interface populating operation comprises pre-populating one or more interface elements of a temporal external resource (TER) vector allocations template for the website identifier.

Example 154. A method according to any of the foregoing examples, wherein an interface element comprises one or more of an image, a currency element, or a TER allocation element.

Example 155. A method according to any of the foregoing examples, wherein the TER allocation element comprises a selectable icon for completing a TER allocation operation in accordance with a TER vector.

Example 156. A method according to any of the foregoing examples, wherein the TER allocation element comprises a menu icon for completing a TER allocation operation in accordance with a TER vector.

Example 157. A method according to any of the foregoing examples, wherein the resource matrix comprises a plurality of TER vectors.

Example 158. A method according to any of the foregoing examples, further comprising including the output in the website upon receiving electronic approval from a client computing device.

Example 159. A method according to any of the foregoing examples, wherein the one or more website building tools comprise one or more of pages, sub-pages, containers, components, atomic components, content elements, layout elements, templates, or layout rules.

Example 160. A website building system configured to provide temporal external resource (TER) integration. The website building system comprises one or more website building repositories storing one or more website building components and one or more website editing historical interactions associated with a plurality of editing user identifiers, and one or more processors configured to execute software instructions to perform operations for automatically generating electronic temporal external resource (TER) vector allocation recommendation responses. The operations comprise receiving a TER vector allocation recommendation request, wherein the TER vector allocation recommendation request comprises allocation request metadata. The operations further comprise extracting the allocation request metadata. The operations further comprise, based at least in part on the allocation request metadata, retrieving one or more website identifiers associated with a website assembled based at least in part on the one or more website building repositories, wherein the one or more website identifiers are selected from a plurality of website identifiers, and wherein the one or more website identifiers are each associated with an editing user identifier of the plurality of editing user identifiers, and retrieving end-user data from an end-user data corpus comprising electronic interaction data associated with a first end-user identifier of a plurality of end-user identifiers, wherein the end-user data associated with the first end-user identifier comprises one or more electronic interactions performed by a first client computing device associated with the first end-user identifier accessing one or more websites assembled based at least in part on the one or more website building repositories. The operations further comprise, based at least in part on applying one or more trained machine learning models or one or more rule-based models to historical editing interactions associated with the editing user identifier and the end-user data, selecting a TER vector. The operations further comprise generating an TER vector allocation recommendation according to the TER vector, and transmitting the TER vector allocation recommendation to a requesting client computing device.

Example 161. A system according to Example 160, wherein the one or more trained machine learning models are trained using historical editing interactions associated with a plurality of editing user identifiers assembling websites based at least in part on the one or more website building repositories and end-user data associated with the plurality of end-user identifiers comprising one or more electronic interactions performed by a plurality of client computing devices associated with the plurality of end-user identifiers accessing one or more websites assembled based at least in part on the one or more website building repositories.

Example 162. A system according to any of the foregoing examples, wherein the one or more trained machine learning models are configured to select the TER vector, based at least in part on the historical editing interactions associated with the editing user identifier and the end-user data, wherein the TER vector is selected in accordance with a first programmatically generated likelihood that a TER allocation operation will be executed in accordance with the TER vector for the first end-user identifier and the one or more website identifiers and a second programmatically generated likelihood that the TER allocation operation will be associated with a positive engagement indicator.

Example 163. A system according to any of the foregoing examples, wherein the one or more rule-based models are configured to select the TER vector, based at least in part on the historical editing interactions associated with the editing user identifier and the end-user data, wherein the TER vector is identified in accordance with learned rules.

Example 164. A system according to any of the foregoing examples, wherein the TER vector is further selected based at least in part on maximizing TER vector allocations for a multi-dimensional matrix associated with the allocation request metadata.

Example 165. A system according to any of the foregoing examples, wherein the one or more website identifiers are retrieved based at least in part on determined similarities between data associated with the one or more website identifiers and one or more items of the allocation request metadata.

Example 166. A system according to any of the foregoing examples, wherein the first end-user identifier is selected based at least in part on determined similarities between interactions and end-user data associated with the first end-user identifier and one or more items of the allocation request metadata.

Example 167. A system according to any of the foregoing examples, wherein the one or more website building tools comprise one or more of pages, sub-pages, containers, components, atomic components, content elements, layout elements, templates, or layout rules.

Example 168. A system according to any of the foregoing examples, wherein the TER vector comprises a plurality of TER vector records.

Example 169. A system according to any of the foregoing examples, wherein a TER vector record of the plurality of TER vector records comprises one or more of an event identifier, an event type identifier, a TER start time, a TER end time, or a TER location.

Example 170. A system according to any of the foregoing examples, wherein the one or more electronic interactions comprise one or more TER vector allocations associated with the first end-user identifier and the one or more website identifiers.

Example 171. A system according to any of the foregoing examples, wherein end-user data further comprises electronic interaction data received from a remote computing device associated with the one or more website identifiers.

Example 172. A system according to any of the foregoing examples, wherein the remote computing device is one of a point-of-sale terminal, or a sensor device.

Example 173. A non-transitory computer-readable storage medium storing instructions that, when executed by at least one processor of an apparatus, cause the apparatus to perform operations for automatically generating electronic temporal external resource (TER) vector allocation recommendation responses. The operations comprise receiving a TER vector allocation recommendation request, wherein the TER vector allocation recommendation request comprises allocation request metadata. The operations further comprise extracting the allocation request metadata. The operations further comprise, based at least in part on the allocation request metadata, retrieving one or more website identifiers associated with a website assembled based at least in part on one or more website building repositories, wherein the one or more website building repositories store one or more website building components and one or more website editing historical interactions associated with a plurality of editing user identifiers, wherein the one or more website identifiers are selected from a plurality of website identifiers, and wherein the one or more website identifiers are each associated with an editing user identifier of the plurality of editing user identifiers, and retrieving end-user data from an end-user data corpus comprising electronic interaction data associated with a first end-user identifier of a plurality of end-user identifiers, wherein the end-user data associated with the first end-user identifier comprises one or more electronic interactions performed by a first client computing device associated with the first end-user identifier accessing one or more websites assembled based at least in part on the one or more website building repositories. The operations further comprise, based at least in part on applying one or more trained machine learning models or one or more rule-based models to historical editing interactions associated with the editing user identifier and the end-user data, selecting a TER vector. The operations further comprise generating an TER vector allocation recommendation according to the TER vector, and transmitting the TER vector allocation recommendation to a requesting client computing device.

Example 174. A storage medium according to Example 173, wherein the one or more trained machine learning models are trained using historical editing interactions associated with a plurality of editing user identifiers assembling websites based at least in part on the one or more website building repositories and end-user data associated with the plurality of end-user identifiers comprising one or more electronic interactions performed by a plurality of client computing devices associated with the plurality of end-user identifiers accessing one or more websites assembled based at least in part on the one or more website building repositories.

Example 175. A storage medium according to any of the foregoing examples, wherein the one or more trained machine learning models are configured to select the TER vector, based at least in part on the historical editing interactions associated with the editing user identifier and the end-user data, wherein the TER vector is selected in accordance with a first programmatically generated likelihood that a TER allocation operation will be executed in accordance with the TER vector for the first end-user identifier and the one or more website identifiers and a second programmatically generated likelihood that the TER allocation operation will be associated with a positive engagement indicator.

Example 176. A storage medium according to any of the foregoing examples, wherein the one or more rule-based models are configured to select the TER vector, based at least in part on the historical editing interactions associated with the editing user identifier and the end-user data, wherein the TER vector is identified in accordance with learned rules.

Example 177. A storage medium according to any of the foregoing examples, wherein the TER vector is further selected based at least in part on maximizing TER vector allocations for a multi-dimensional matrix associated with the allocation request metadata.

Example 178. A storage medium according to any of the foregoing examples, wherein the one or more website identifiers are retrieved based at least in part on determined similarities between data associated with the one or more website identifiers and one or more items of the allocation request metadata.

Example 179. A storage medium according to any of the foregoing examples, wherein the first end-user identifier is selected based at least in part on determined similarities between interactions and end-user data associated with the first end-user identifier and one or more items of the allocation request metadata.

Example 180. A storage medium according to any of the foregoing examples, wherein the one or more website building tools comprise one or more of pages, sub-pages, containers, components, atomic components, content elements, layout elements, templates, or layout rules.

Example 181. A storage medium according to any of the foregoing examples, wherein the TER vector comprises a plurality of TER vector records.

Example 182. A storage medium according to any of the foregoing examples, wherein a TER vector record of the plurality of TER vector records comprises one or more of an event identifier, an event type identifier, a TER start time, a TER end time, or a TER location.

Example 183. A storage medium according to any of the foregoing examples, wherein the one or more electronic interactions comprise one or more TER vector allocations associated with the first end-user identifier and the one or more website identifiers.

Example 184. A storage medium according to any of the foregoing examples, wherein end-user data further comprises electronic interaction data received from a remote computing device associated with the one or more website identifiers.

Example 185. A storage medium according to any of the foregoing examples, wherein the remote computing device is one of a point-of-sale terminal, or a sensor device.

Example 186. A computer-implemented method for automatically generating electronic temporal external resource (TER) vector allocation recommendation responses. The method comprises receiving a TER vector allocation recommendation request, wherein the TER vector allocation recommendation request comprises allocation request metadata. The method further comprises extracting the allocation request metadata. The method further comprises, based at least in part on the allocation request metadata, retrieving one or more website identifiers associated with a website assembled based at least in part on one or more website building repositories, wherein the one or more website building repositories store one or more website building components and one or more website editing historical interactions associated with a plurality of editing user identifiers, wherein the one or more website identifiers are selected from a plurality of website identifiers, and wherein the one or more website identifiers are each associated with an editing user identifier of the plurality of editing user identifiers, and retrieving end-user data from an end-user data corpus comprising electronic interaction data associated with a first end-user identifier of a plurality of end-user identifiers, wherein the end-user data associated with the first end-user identifier comprises one or more electronic interactions performed by a first client computing device associated with the first end-user identifier accessing one or more websites assembled based at least in part on the one or more website building repositories. The method further comprises, based at least in part on applying one or more trained machine learning models or one or more rule-based models to historical editing interactions associated with the editing user identifier and the end-user data, selecting a TER vector. The method further comprises generating an TER vector allocation recommendation according to the TER vector, and transmitting the TER vector allocation recommendation to a requesting client computing device.

Example 187. A method according to Example 186, wherein the one or more trained machine learning models are trained using historical editing interactions associated with a plurality of editing user identifiers assembling websites based at least in part on the one or more website building repositories and end-user data associated with the plurality of end-user identifiers comprising one or more electronic interactions performed by a plurality of client computing devices associated with the plurality of end-user identifiers accessing one or more websites assembled based at least in part on the one or more website building repositories.

Example 188. A method according to any of the foregoing examples, wherein the one or more trained machine learning models are configured to select the TER vector, based at least in part on the historical editing interactions associated with the editing user identifier and the end-user data, wherein the TER vector is selected in accordance with a first programmatically generated likelihood that a TER allocation operation will be executed in accordance with the TER vector for the first end-user identifier and the one or more website identifiers and a second programmatically generated likelihood that the TER allocation operation will be associated with a positive engagement indicator.

Example 189. A method according to any of the foregoing examples, wherein the one or more rule-based models are configured to select the TER vector, based at least in part on the historical editing interactions associated with the editing user identifier and the end-user data, wherein the TER vector is identified in accordance with learned rules.

Example 190. A method according to any of the foregoing examples, wherein the TER vector is further selected based at least in part on maximizing TER vector allocations for a multi-dimensional matrix associated with the allocation request metadata.

Example 191. A method according to any of the foregoing examples, wherein the one or more website identifiers are retrieved based at least in part on determined similarities between data associated with the one or more website identifiers and one or more items of the allocation request metadata.

Example 192. A method according to any of the foregoing examples, wherein the first end-user identifier is selected based at least in part on determined similarities between interactions and end-user data associated with the first end-user identifier and one or more items of the allocation request metadata.

Example 193. A method according to any of the foregoing examples, wherein the one or more website building tools comprise one or more of pages, sub-pages, containers, components, atomic components, content elements, layout elements, templates, or layout rules.

Example 194. A method according to any of the foregoing examples, wherein the TER vector comprises a plurality of TER vector records.

Example 195. A method according to any of the foregoing examples, wherein a TER vector record of the plurality of TER vector records comprises one or more of an event identifier, an event type identifier, a TER start time, a TER end time, or a TER location.

Example 196. A method according to any of the foregoing examples, wherein the one or more electronic interactions comprise one or more TER vector allocations associated with the first end-user identifier and the one or more website identifiers.

Example 197. A method according to any of the foregoing examples, wherein end-user data further comprises electronic interaction data received from a remote computing device associated with the one or more website identifiers.

Example 198. A method according to any of the foregoing examples, wherein the remote computing device is one of a point-of-sale terminal, or a sensor device.

CONCLUSION

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A website building system configured to provide temporal external resource (TER) integration within websites generated using the website building system, the website building system comprising:

one or more website building repositories storing one or more website building components and one or more website editing historical interactions associated with a plurality of editing user identifiers; and one or more processors configured to execute software instructions to perform operations for automatically generating electronic temporal external resource (TER) vector allocation recommendation interfaces, the operations comprising:

retrieving a website identifier associated with a website assembled based at least in part on the one or more website building repositories, wherein the website identifier is selected from a plurality of website identifiers, and wherein the website identifier is associated with an editing user identifier of the plurality of editing user identifiers;

retrieving end-user data from an end-user data corpus comprising electronic interaction data associated with a first end-user identifier of a plurality of end-user identifiers, wherein the end-user data associated with the first end-user identifier comprises one or more electronic interactions performed by a first client computing device associated with the first end-user identifier accessing one or more websites assembled based at least in part on the one or more website building repositories;

retrieving a multi-dimensional temporal external resource (TER) matrix maintained by the website building system and associated with the website identifier, wherein the multi-dimensional TER matrix comprises a plurality of TER vectors;

based at least in part on applying one or more trained machine learning models or one or more rule-based models to historical editing interactions associated with the editing user identifier and the end-user data, selecting a TER vector;

generating an electronic TER recommendation interface according to the TER vector; and transmitting the electronic TER recommendation interface to a client computing device associated with the first end-user identifier or the editing user identifier.

2. The website building system of claim 1, wherein the one or more trained machine learning models are trained using historical editing interactions associated with a plurality of editing user identifiers assembling websites based at least in part on the one or more website building repositories and end-user data associated with the plurality of end-user identifiers comprising one or more electronic interactions performed by a plurality of client computing devices associated with the plurality of end-user identifiers accessing one or more websites assembled based at least in part on the one or more website building repositories.

3. The website building system of claim 1, wherein the one or more trained machine learning models are configured to select the TER vector, based at least in part on the historical editing interactions associated with the editing user identifier and the end-user data, wherein the TER vector is selected in accordance with a first programmatically generated likelihood that a TER allocation operation will be executed in accordance with the TER vector for the first end-user identifier and the website identifier and a second programmatically generated likelihood that the TER allocation operation will be associated with a positive engagement indicator.

4. The website building system of claim 3, wherein the TER vector is further selected based at least in part on maximizing TER vector allocations for the multi-dimensional TER matrix.

5. The website building system of claim 3, wherein the TER vector is further selected based at least in part on one of an expected currency value associated with a TER vector allocation for the TER vector and the first end-user identifier or whether the TER vector is associated with an in-progress event.

6. The website building system of claim 1, wherein the one or more rule-based models are configured to select the TER vector, based at least in part on the historical editing interactions associated with the editing user identifier and the end-user data, wherein the TER vector is identified in accordance with learned rules.

7. The website building system of claim 1, wherein the one or more website building tools comprise one or more of pages, sub-pages, containers, components, atomic components, content elements, layout elements, templates, or layout rules.

8. The website building system of claim 1, wherein the TER vector comprises a plurality of TER vector records.

9. The website building system of claim 8, wherein a TER vector record of the plurality of TER vector records comprises one or more of an event identifier, an event type identifier, a TER start time, a TER end time, or a TER location.

10. The website building system of claim 1, wherein the one or more electronic interactions comprise one or more TER vector allocations associated with the first end-user identifier and the website identifier.

11. The website building system of claim 10, wherein the one or more TER vector allocations are associated with an engagement indicator.

12. The website building system of claim 11, wherein the engagement indicator is one of positive, negative, or partial.

13. The website building system of claim 11, wherein the first end-user identifier is associated with a plurality of TER vector allocations associated with the website identifier, wherein every TER vector allocation of the plurality of TER vector allocations is associated with a positive engagement indicator.

14. The website building system of claim 1, wherein end-user data further comprises electronic interaction data received from a remote computing device associated with the website identifier.

15. The website building system of claim 14, wherein the remote computing device is one of a point-of-sale terminal, or a sensor device.

16. The website building system of claim 1, wherein the website identifier is associated with a transaction category type.

17. The website building system of claim 16, wherein the transaction category type is one of electronic or non-electronic.

18. The website building system of claim 1, wherein the electronic TER recommendation interface comprises one or more selectable interface elements.

19. The website building system of claim 1, wherein the operations further comprise:

automatically executing a TER vector allocation operation in accordance with the TER vector.

20. The website building system of claim 19, wherein the operations further comprise:

based at least in part on executing the TER vector allocation operation:

transforming an availability record associated with the TER vector to reflect the TER vector allocation operation; and synchronizing the multi-dimensional TER matrix with a second multi-dimensional TER matrix.

21. The website building system of claim 20, wherein the operations further comprise:

configuring the second multi-dimensional TER matrix for display via the website.

22. A non-transitory computer readable storage medium storing instructions that, when executed by at least one processor of an apparatus, cause the apparatus to perform operations for automatically generating electronic temporal external resource (TER) vector allocation recommendation interfaces within a website building system, the operations comprising:

retrieving a website identifier associated with a website assembled based at least in part on one or more website building repositories, wherein the one or more website building repositories store one or more website building components and one or more website editing historical interactions associated with a plurality of editing user identifiers, wherein the website identifier is selected from a plurality of website identifiers, and wherein the website identifier is associated with an editing user identifier of the plurality of editing user identifiers;

retrieving end-user data from an end-user data corpus comprising electronic interaction data associated with a first end-user identifier of a plurality of end-user identifiers, wherein the end-user data associated with the first end-user identifier comprises one or more electronic interactions performed by a first client computing device associated with the first end-user identifier accessing one or more websites assembled based at least in part on the one or more website building repositories;

retrieving a multi-dimensional temporal external resource (TER) matrix maintained by the website building system and associated with the website identifier, wherein the multi-dimensional TER matrix comprises a plurality of TER vectors;

based at least in part on applying one or more trained machine learning models or one or more rule-based models to historical editing interactions associated with the editing user identifier and the end-user data, selecting a TER vector;

generating an electronic TER recommendation interface according to the TER vector; and transmitting the electronic TER recommendation interface to a client computing device associated with the first end-user identifier or the editing user identifier.

23. A computer-implemented method for automatically generating electronic temporal external resource (TER) vector allocation recommendation interfaces within a website building system, the method comprising:

retrieving a website identifier associated with a website assembled based at least in part on one or more website building repositories, wherein the one or more website building repositories store one or more website building components and one or more website editing historical interactions associated with a plurality of editing user identifiers, wherein the website identifier is selected from a plurality of website identifiers, and wherein the website identifier is associated with an editing user identifier of the plurality of editing user identifiers;

retrieving end-user data from an end-user data corpus comprising electronic interaction data associated with a first end-user identifier of a plurality of end-user identifiers, wherein the end-user data associated with the first end-user identifier comprises one or more electronic interactions performed by a first client computing device associated with the first end-user identifier accessing one or more websites assembled based at least in part on the one or more website building repositories;

retrieving a multi-dimensional temporal external resource (TER) matrix maintained by the website building system and associated with the website identifier, wherein the multi-dimensional TER matrix comprises a plurality of TER vectors;

based at least in part on applying one or more trained machine learning models or one or more rule-based models to historical editing interactions associated with the editing user identifier and the end-user data, selecting a TER vector;

generating an electronic TER recommendation interface according to the TER vector; and transmitting the electronic TER recommendation interface to a client computing device associated with the first end-user identifier or the editing user identifier.

* * * * *